(12) United States Patent
Freeberg et al.

(10) Patent No.: US 7,949,726 B2
(45) Date of Patent: May 24, 2011

(54) SYSTEM AND METHOD FOR DELIVERING INFORMATION ON DEMAND

(75) Inventors: Mark Freeberg, Seattle, WA (US); Luis Soltero, Maryville, TN (US)

(73) Assignee: Ocean and Coastal Environmental Sensing, Inc., Seattle, WA (US)

( * ) Notice: Subject to any disclaimer, the term of this patent is extended or adjusted under 35 U.S.C. 154(b) by 1135 days.

(21) Appl. No.: 11/078,633

(22) Filed: Mar. 11, 2005

(65) Prior Publication Data

US 2005/0203917 A1 Sep. 15, 2005

Related U.S. Application Data

(60) Provisional application No. 60/552,918, filed on Mar. 12, 2004.

(51) Int. Cl.
*G06F 15/16* (2006.01)
(52) U.S. Cl. .................................................... 709/218
(58) Field of Classification Search .................. 709/203, 709/218; 707/10
See application file for complete search history.

(56) References Cited

U.S. PATENT DOCUMENTS

| | | | |
|---|---|---|---|
| 5,559,707 A | 9/1996 | DeLorme et al. | |
| 5,579,471 A | 11/1996 | Barber et al. | |
| 5,764,518 A | 6/1998 | Collins | |
| 5,802,492 A | 9/1998 | DeLorme et al. | |
| 5,862,325 A | 1/1999 | Reed et al. | |
| 5,987,454 A * | 11/1999 | Hobbs .................................. | 1/1 |
| 6,088,717 A | 7/2000 | Reed et al. | |
| 6,088,730 A | 7/2000 | Kato et al. | |
| 6,115,750 A | 9/2000 | Dillon et al. | |
| 6,119,167 A | 9/2000 | Boyle et al. | |
| 6,133,912 A | 10/2000 | Montero | |
| 6,138,009 A | 10/2000 | Birgerson | |
| 6,138,158 A | 10/2000 | Boyle et al. | |
| 6,157,935 A | 12/2000 | Tran et al. | |
| 6,182,122 B1 * | 1/2001 | Berstis ............................ | 709/217 |
| 6,212,166 B1 | 4/2001 | Akiyama et al. | |
| 6,237,022 B1 | 5/2001 | Bruck et al. | |
| 6,243,417 B1 | 6/2001 | Obikane et al. | |
| 6,260,061 B1 * | 7/2001 | Krishnan et al. ............... | 709/213 |
| 6,268,856 B1 | 7/2001 | Bruck et al. | |
| 6,308,329 B1 | 10/2001 | Takahashi | |
| 6,311,058 B1 | 10/2001 | Wecker et al. | |
| 6,321,268 B1 | 11/2001 | Dillon et al. | |
| 6,331,870 B1 | 12/2001 | LeCompte | |
| 6,336,142 B1 | 1/2002 | Kato et al. | |
| 6,345,288 B1 * | 2/2002 | Reed et al. ..................... | 709/201 |
| 6,351,777 B1 | 2/2002 | Simonoff | |

(Continued)

*Primary Examiner* — Kevin Bates
*Assistant Examiner* — Jason Recek
(74) *Attorney, Agent, or Firm* — Luedeka, Neely & Graham, PC

(57) ABSTRACT

A system and method designed to optimize the delivery of information on demand via wired or wireless connections. Dynamic information such as weather data can be delivered as compressed text, images, charts, buoy data, radar, GRIB files, and many more formats. Numerous continuously updated products can be delivered to a user of a client application on demand by the push of a button. The user can generate a batch folder having a list of data products to download. The data list in the batch folder can be requested from a server using a single command. The system and method can be configured to immediately connect to a server via a wireless connection or email, including satellite phone and HF/Pactor Radio, and downloads the requested data. After the download the client can be configured to automatically display the requested data.

24 Claims, 23 Drawing Sheets

U.S. PATENT DOCUMENTS

| | | |
|---|---|---|
| 6,381,534 B2 | 4/2002 | Takayama et al. |
| 6,405,179 B1 | 6/2002 | Rebane |
| 6,418,417 B1 | 7/2002 | Corby et al. |
| 6,480,883 B1 | 11/2002 | Tsutsumitake |
| 6,486,892 B1 | 11/2002 | Stern |
| 6,498,987 B1 | 12/2002 | Kelly et al. |
| 6,504,570 B2 | 1/2003 | LeCompte |
| 6,519,568 B1 | 2/2003 | Harvey et al. |
| 6,553,410 B2 | 4/2003 | Kikinis |
| 6,560,604 B1 | 5/2003 | Fascenda |
| 6,567,745 B2 | 5/2003 | Fuchs et al. |
| 6,567,792 B1 | 5/2003 | Arnold |
| 6,574,657 B1 | 6/2003 | Dickinson |
| 6,584,447 B1 | 6/2003 | Fox et al. |
| 6,590,529 B2 | 7/2003 | Schwoegler |
| 6,591,382 B1 | 7/2003 | Molloy et al. |
| 6,597,280 B1 | 7/2003 | Daniel |
| 6,597,776 B1 | 7/2003 | Walker et al. |
| 6,597,990 B2 | 7/2003 | Brown |
| 6,603,974 B1 | 8/2003 | Rollender |
| 6,604,045 B2 | 8/2003 | Kuroda et al. |
| 6,604,149 B1 | 8/2003 | Deo et al. |
| 6,606,553 B2 | 8/2003 | Zobell et al. |
| 6,606,748 B1 | 8/2003 | Tomioka et al. |
| 6,609,108 B1 | 8/2003 | Pulliam et al. |
| 6,611,821 B2 | 8/2003 | Stahl et al. |
| 6,617,964 B1 | 9/2003 | Lamb |
| 6,621,508 B1 | 9/2003 | Shiraishi et al. |
| 6,622,067 B1 | 9/2003 | Lovelace, II et al. |
| 6,625,128 B1 | 9/2003 | Bharath et al. |
| 6,628,934 B2 | 9/2003 | Rosenberg et al. |
| 6,628,938 B1 | 9/2003 | Rachabathuni et al. |
| 6,629,136 B1 | 9/2003 | Naidoo |
| 6,636,488 B1 | 10/2003 | Varma |
| 6,636,801 B2 | 10/2003 | Curbow |
| 6,643,510 B2 | 11/2003 | Taylor |
| 6,643,571 B2 | 11/2003 | Götvall et al. |
| 6,643,581 B2 | 11/2003 | Ooishi |
| 6,643,655 B2 | 11/2003 | Oashi et al. |
| 6,647,250 B1 | 11/2003 | Bultman et al. |
| 6,647,469 B1 | 11/2003 | Sharma et al. |
| 6,650,284 B1 | 11/2003 | Mannings et al. |
| 6,650,348 B2 | 11/2003 | Mariani et al. |
| 6,650,902 B1 | 11/2003 | Richton |
| 6,654,681 B1 | 11/2003 | Schmidt et al. |
| 6,654,689 B1 | 11/2003 | Kelly et al. |
| 6,654,726 B1 | 11/2003 | Hanzek |
| 6,654,746 B1 | 11/2003 | Wong et al. |
| 6,657,558 B2 | 12/2003 | Horita et al. |
| 6,658,419 B2 | 12/2003 | Pasquali |
| 6,658,463 B1 | 12/2003 | Dillon et al. |
| 6,658,467 B1 | 12/2003 | Rice et al. |
| 6,659,039 B1 | 12/2003 | Larsen |
| 6,662,106 B2 | 12/2003 | Evans |
| 6,662,195 B1 | 12/2003 | Langseth et al. |
| 6,662,218 B2 | 12/2003 | Mighdoll et al. |
| 7,158,525 B2 * | 1/2007 | Daffner et al. ................ 370/401 |
| 7,487,250 B2 * | 2/2009 | Siegel ........................ 709/227 |
| 2004/0044781 A1 * | 3/2004 | Hymel et al. ................ 709/229 |
| 2004/0121814 A1 * | 6/2004 | Creamer et al. ............. 455/563 |
| 2004/0199664 A1 * | 10/2004 | Feldman et al. ............. 709/238 |
| 2005/0138176 A1 * | 6/2005 | Singh et al. ................. 709/226 |
| 2005/0160140 A1 * | 7/2005 | Kadyk et al. ................ 709/203 |
| 2005/0165615 A1 * | 7/2005 | Minar .............................. 705/1 |
| 2006/0190564 A1 * | 8/2006 | Arnold ........................ 709/219 |
| 2008/0235106 A1 * | 9/2008 | Reisman ........................ 705/26 |

* cited by examiner

SYSTEM AND METHOD FOR DELIVERING INFORMATION ON DEMAND

CROSS-REFERENCES TO RELATED APPLICATIONS

This application claims the benefit of U.S. Provisional Application No. 60/552,918, filed Mar. 12, 2004, entitled "SYSTEM AND METHOD FOR WEATHER ON DEMAND," hereby incorporated herein by reference in its entirety.

BACKGROUND OF THE DISCLOSURE

The disclosure relates to the field of electronic communications. More particularly, the disclosure relates to systems and methods for efficient delivery of information on demand.

A great amount of information is dynamic in nature and only has relevance for a short time frame. For example, weather information is dynamic and is not inherently predictable based on past data. Additionally, other types of data are not inherently dynamic, but only have relevance for a short time frame. For example, an outcome of an election or sporting event does not change as a function of time, but the relevance of the outcome may decrease with the passage of time.

The need to have up to date information, such as weather information, is critical to many individuals and operations. People in remote locations often have the greatest need for accurate up to date weather information. Such individuals and businesses may be in marine environments or remote environments that are not conducive to conventional information reporting methods. Individuals in remote locations can use wireless communication devices, such as satellite terminals, satellite telephones, or high frequency transceivers to receive desired information. Individuals can use the wireless communication devices, for example, to connect with one or more information providers to obtain the desired information. For example, a substantial amount of weather information can be obtained from publicly accessible sites on the Internet. Thus, a remote user, such as a user on a marine vessel, can use a satellite phone to connect to the Internet and navigate to the relevant web pages to obtain the desired information.

However, the costs associated with the wireless link and the time required to access and download or otherwise obtain the information may be prohibitive. Satellite telephones typically charge a per minute connection fee and have a relatively slow data rate compared to a wired network connection. Moreover, there is no way for a remote user to receive dynamic data such as a news feed without continually checking for updates.

It is desirable for remote users to have the ability to efficiently access and retrieve dynamic information. The remote users may only have a limited data bandwidth relative to a wired interface, such as an Ethernet connection. For example, satellite phones may only be capable of data rates on the order of 2400 baud or 9600 baud.

Embodiments disclosed herein address the above problem and other problems, individually and collectively.

BRIEF SUMMARY OF THE DISCLOSURE

A system and method designed to optimize the delivery of information on demand via wired or wireless connections. Dynamic information such as weather data can be delivered as compressed text, images, charts, buoy data, radar, GRIB files, and many more formats. Numerous continuously updated products can be delivered to a user of a client application on demand by the push of a button. The user can generate a batch folder having a list of data products to download. The data list in the batch folder can be requested from a server using a single command. The system and method can be configured to immediately connect to a server via a wireless or wired connection or email, including satellite phone and HF/Pactor Radio, and downloads the requested data. After the download the client can be configured to automatically display the requested data.

The disclosure includes a method of receiving content on demand from a system having stored content. The method includes generating, prior to establishing a connection with the system, a content request, establishing a communication link with a server in the system;

transmitting the content request to the server, receiving content from the server in response to the content request, and outputting, based on a predetermined configuration, at least one of the content received from the server.

The disclosure also includes a method of providing content on demand from a system having stored content. The method includes receiving a content request, retrieving a plurality of content files, based on the content request, from a data store having a copy of the content file obtained from an original content source, compressing each of the plurality of content files in a predetermined manner associated with a content type to generate a plurality of compressed content files, concatenating the plurality of compressed content files, delivering content via block transfer, and providing the content in response to the content request.

The disclosure also includes an apparatus for receiving content on demand from a system having stored content. The apparatus includes a user communication device configured to establish a communication link with the system, a user terminal coupled to the user communication device and configured to communicate with the system when the communication link is established, and a client application operating in conjunction with the user terminal, and configured to receive user selections from a content library; generate a content request based on the user selections; command the user communication device to establish the communication link, communicate the content request to the system via the user terminal; receive content in response to the content request; and automatically command the user communication device to disconnect the communication link upon receipt of all of the content in the content request.

The disclosure also includes a system for providing content on demand. The system includes a data store configured to store one or more content files and a cost associated with each of the one or more content files, a robot configured to access one or more original content sources for content files and copy the content files from the original content source to the data store, a server coupled to the data store and configured to receive a content request from a user having a system account, retrieve requested content files based on the content request, deliver the requested content files to the user, determine a cost associated with fulfilling the content request, and apply the cost to the system account corresponding to the user.

Various features and advantages can be more fully appreciated with reference to the detailed description and accompanying drawings that follow.

BRIEF DESCRIPTION OF THE DRAWINGS

The features, objects, and advantages of embodiments of the disclosure will become more apparent from the detailed

DETAILED DESCRIPTION OF THE DISCLOSURE

Figure 1:
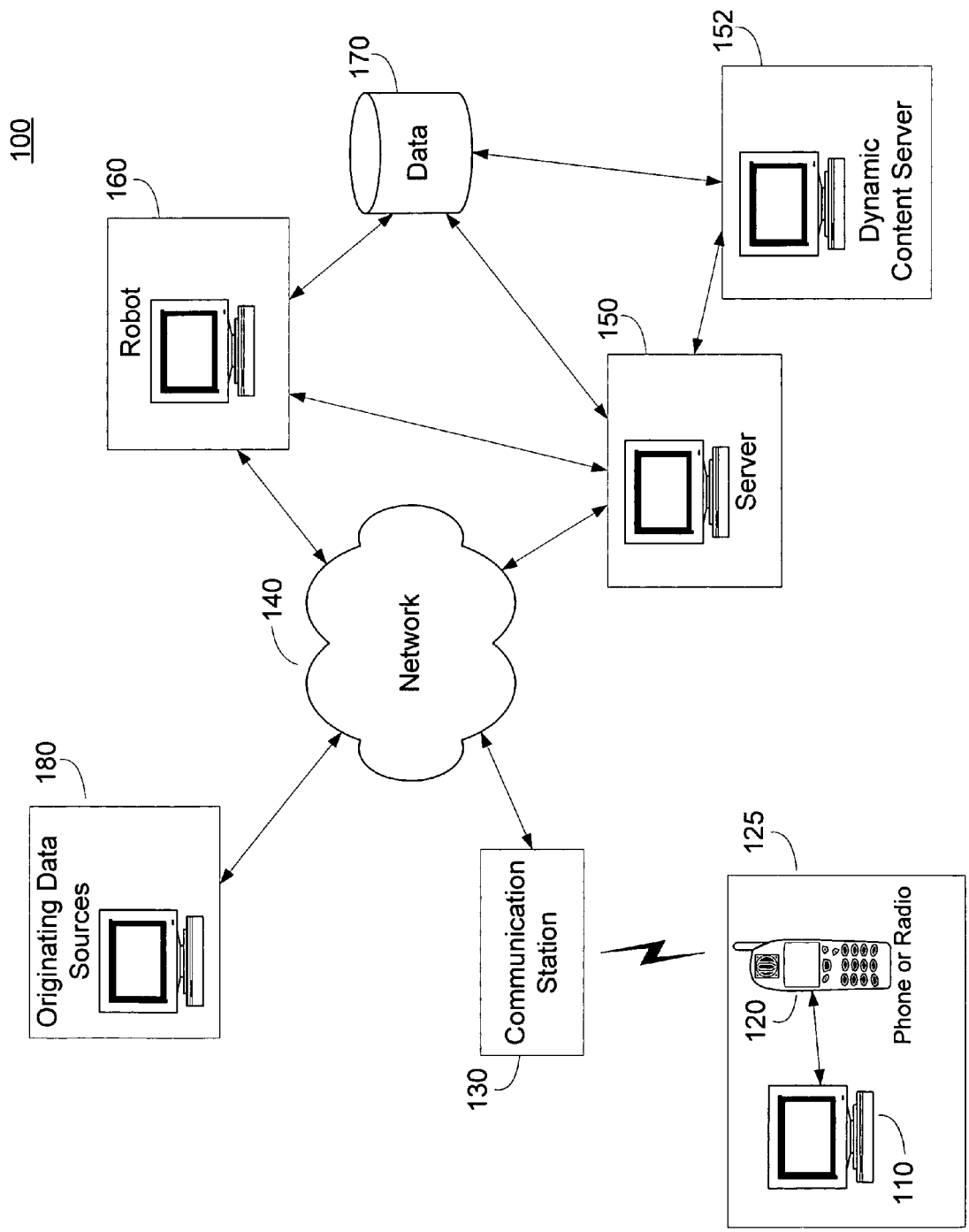
FIG. 1 is a functional block diagram of an embodiment of a system for delivery of information on demand.

Systems and methods for efficient transfer of desired information over communication links having relatively low bandwidths are disclosed. A user can generate a data request while offline. The user can use a graphical user interface to create a batch file including the data requests by selecting desired data from a catalog, list, or menu of available data. The user can request the data using the batch file and can request that a single instance of the data be delivered or can request that multiple instances of the data be sent according to a schedule that is also included in the batch file.

The user can request the data by establishing a connection with a data server over a communication link and transmitting the batch file containing the data request to the server. The server, upon receipt of the batch file containing the data request, can determine the types and identity of the data being requested by the user. The server can retrieve the requested data from associated databases, compress the data according to one or more compression techniques, and transmit the data to the user over the communication link.

To minimize the time required to retrieve the requested data, a searcher or robot can continuously or periodically retrieve from original sources the data that is offered to the user in the catalog, list, or menu of available data. The robot can store retrieved data in a data store or database that is accessible to the server. The server may access the data store or databases that store the desired information without having to request and retrieve the data from an originating data source.

Thus, a client application can be used to build a content request off line. Each content file requested can have a cost associated with it. When the content is requested, the client application can automatically connect to the system server, perform any log in or authorization responses, deliver the content request, download the content in the content request, and automatically disconnect a communication device from the system. The server can determine the cost associated with fulfilling the content request and can bill an account associated with the user.

The connection time can be minimized by an amount that more than compensates for the costs of content. The system can decrease delivery time by an amount such that paying for delivery of content over the system can be less expensive than connecting to and retrieving the content from an original content source that does not charge for the content. Each content file can be priced independently and a total cost including associated connection costs can be estimated prior to connecting with the system. Connection costs can include air time costs, which may be extensive for such communication links that utilize satellite telephones or even cellular telephones.

For example, two separate weather images of a Gulf of Mexico'sea surface temperature may be accessed from an original content provider over the Internet, and the original content provider may provide the image free of charge. However, using conventional tools operating over a satellite telephone link that charges approximately $1 per minute for connection time, the download may take on the order of ten minutes to complete. Thus, using conventional techniques, the satellite telephone connection costs alone total approximately $10 Using the described system and method for efficient content transfer the same content file can be delivered in approximately 50 seconds, with the client application automatically connecting and disconnecting the communication link to minimize connection times. Thus, the satellite connection costs are approximately $1. If each content file is priced at approximately $0.75, the total cost for downloading from the system is approximately $2.50. Thus, the same content can be downloaded from a subscription system for less than the total cost for retrieving the content from a free content provider.

In another example, a user having a broadband wired connection may prefer to use the client application to access the content delivery system rather than navigating to each of a plurality of original content providers to retrieve one or more information files. The user can use the client application to build a single request in the form of a batch request and deliver the batch request to a server in the content delivery system. The server can fulfill the request by providing the plurality of information files in response to the single request. In one embodiment, the client application may allow the transmission of a preconfigured batch request using a single button click. A user may prefer the ease and speed of the content delivery system over individually navigating and requesting information from numerous distinct data sources.

The time reduction and convenience of access may offset the costs associated with information delivery using the content delivery system.

FIG. 1 is a functional block diagram of an embodiment of a system 100 for delivery of information on demand. The system 100 includes a user terminal 110 coupled to a user communication device 120. The user terminal 110 can be, for example, a computer configured to execute a client application for requesting and receiving desired information. The user communication device 120 can be, for example, a telephone, cellular telephone, satellite telephone, radio transceiver such as a HF/Pactor radio, or some other apparatus for remote communication. For example, the user terminal 110 can use TCP/IP over a user communication device 120 that include cell phones, satellite phones, HF radio, packet radio, and some other device allow connection to the network 140 or e-mail connection to the network. The user communication device 120 can also use wired lines to transfer information requests.

The user terminal 110 can generate a request for information and can communicate the request to the user communication device 120 to be transmitted to a destination device. In the system 100 of FIG. 1, the request can be directed to a server 150 configured to process the request.

The user terminal 110 can be configured to selectively communicate with a communication station 130. The communication station 130 can be, for example, a network gateway configured to interface network communications to the user terminal 110. The communication station 130 can be coupled to or otherwise in communication with a network 140.

The network 140 can be any type of communication network and can be a private network, a public network, or some combination of private and public networks. The network 140 can be, for example, a Local Area Network (LAN), Wide Area Network (WAN), or some other type or combination of networks. In one embodiment, the network 140 can include the Internet.

A server 150 coupled to the network 140 can be configured to receive the request for information originating at the user terminal 110. The server 150 can determine the information requested by the user terminal 110, retrieve the information from a data store 170, and format the information for delivery to the user terminal 110 in response to the request. The server 150 can also be configured to compress the information retrieved from the data store, and can compress the information based in part on the type of data represented by the information. In other embodiments, the user terminal 110 can request that one or more information types not be compressed and the server 150 can omit compressing that information type.

The server 150 can communicate dynamic content requests to a dynamic content server 152. The dynamic content server 152 can retrieve the information from a data store 170, and process the information in a manner based on one or more fields or data supplied by the user terminal 110 in the request. The dynamic content server 152 can supply the processed information to the server 150 for compression and delivery to the user terminal 110.

The dynamic content server 152 can be configured to receive a dynamic content request from the user terminal 110, via the server 150. In the context of information formatting and delivery the term "dynamic content" or "interactive content" refers to information that is not stored directly in the data store 170, but instead, is derived or otherwise extracted from information in the data store based at least in part on instructions provided by the user terminal 110.

In one embodiment, the data store 170 can be configured to store information files corresponding to vast categories. The files having the vast categories can be referred to as high level files. Examples include, but are not limited to, weather information corresponding to the entire globe, opening and closing stock prices corresponding to all NASDAQ listed stocks, or all sports scores for a day.

The user may not be interested in such vast categories of data. For example, a user may only be interested in weather for a particular region, or particular stock performance, or particular sports scores. The user can generate a dynamic content request that can be included in the information request. The user terminal 110 can include one or more fields, flags, or parameters that indicate to the server 150 that dynamic content is requested.

The server 150 can communicate the dynamic content requests to the dynamic content server 152. The dynamic content server 152 can then retrieve a high level file corresponding to the requested dynamic content. The dynamic content server 152 can process the high level file based on the dynamic content request to generate the desired dynamic content.

For example, a client application operating in the user terminal 110 can allow the user to select a particular weather element such as wind data or sea current data and can provide one or more fields in which the user can enter a desired latitude and longitude and associated width in degrees of latitude and longitude. The dynamic content server 152 can access a high level file including worldwide wind or sea current data and can process or otherwise extract from the high level file the desired dynamic content. The dynamic content server 152 can then deliver the dynamic content to the server 150 for delivery to the user terminal 110.

In another example, the user terminal 110 can include in a request a portfolio of stocks and can request a daily update of the performance of the stock portfolio. The dynamic content server 152 can retrieve a high level file of all stock prices for a particular day and can generate the dynamic content corresponding to the desired stock portfolio based on the dynamic content request. The dynamic content server 152 can provide a file having the desired stock portfolio to the requesting user terminal. Thus, the dynamic content server 152 can allow the system to generate and provide dynamic content file that are not stored in the data store 170, but instead are derived or otherwise dynamically generated from information stored in the data store.

FIG. 1 shows the server 150 and dynamic content server 152 as distinct servers for the purposes of explanation. In one embodiment, each of the server 150 and dynamic content server 152 can include one or more servers, such as a bank of servers, computers, or processors configured to perform the described functionality. In another embodiment, the server 150 and dynamic content server 152 can be implemented in the same server or bank of servers and the division between the server 150 and the dynamic content server 152 can be virtual, rather than physical.

The server 150 can communicate the requested information to the requesting user terminal 110 via the network 140 and communication station 130. The server 150 can include a command to terminate the connection between the communication station 130 and user communication device 120 upon completion of the delivery of the information to the user terminal 110. This command can operate to minimize the connection time and costs associated with connection time.

Upon receipt of the desired information, the user terminal 110 can be configured to store and decompress the information for subsequent output. For example, the user terminal can be configured to decompress image files and store and display the images.

The data store 170 can be configured to store copies of all of the information that the user terminal 110 can request from the server 150. A network robot 160 coupled to the network 140 can be a crawler, searcher, and the like, or some other apparatus for searching. The network robot 160 can be configured to search sites connected to the network 140 that have the desired information. In one embodiment, the network robot 160 identifies one or more originating data sources 180 connected to the network 140 that have the desired information. The desired information can be, for example, dynamic information such as weather images that can be expected to change. The one or more originating sources can be configured to update the information periodically, or based on changes in the information. The network robot 160 can be configured to periodically access each of the one or more originating data sources 180 having the desired information and can download or otherwise make a copy of the information and store it in the data store 170. Therefore, the network robot 160 can be configured to ensure that the data store 170 includes a copy of the most recent information available from the one or more originating data sources 180.

For example, in one embodiment, the network robot 160 is an Internet robot that is configured to search private and public information repositories for weather information. The network robot 160 can locate the information and transmit or otherwise communicate it to the data store 170 that can include one or more information repositories that can be, for example, a centralized server or combination of servers or a database or combination of databases. The network robot 160 can transfer the information using any number of communication protocols. Such protocols can include, but are not limited to, http, ftp, gopher, scp, rcp, rsync, unison, e-mail protocols, and the like, or some other protocol.

In one embodiment, the network robot 160 searches and retrieves substantially all available information of a particular category or type. For example, a network robot 160 may search a substantial number of available weather reporting sites and services and communicate the information back to the data store 170 where the information is stored in one or more databases. The weather information can represent, for example, all or substantially all of the weather information available for any location on the globe.

In one embodiment, the system 100 can be configured to provide weather information, including GRIB, Satellite Imagery, Weather Charts, Text, Ice, Radar, Ocean Charts. In other embodiments, the information can include news, sports information, financial information including stock quotes and trends, software, electronic charts, fishing quotas, and the like, or some other information. The news and similar dynamic reporting information can be supplied to the data store 170, network robot 160, or some other information server for storage in the data store 170 as Really Simple Syndication (RSS) news feed data.

Figure 2:
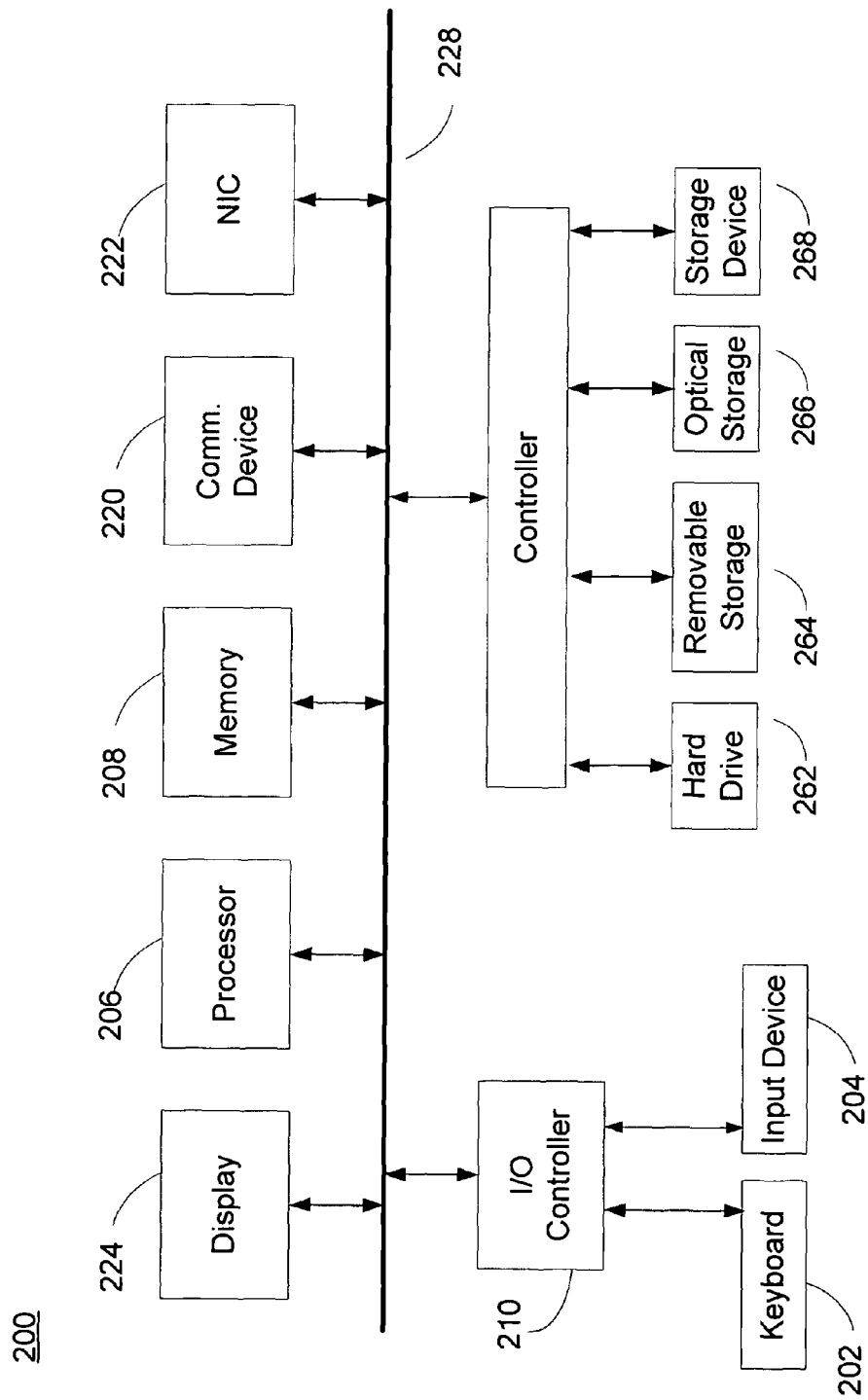
FIG. 2 is a functional block diagram of an embodiment of a computer that can be used with the system.

FIG. 2 is a functional block diagram of an embodiment of a computer 200 that can be used with the system. The computer 200 can be, for example, an embodiment of the user device 110, server 150, or originating data source 180 of the system 100 of FIG. 1.

The computer 200 can include a display 224, a processor 206, memory 208, a communication device such as a modem 220, a network interface Card (NIC) 222, an I/O controller 210, and a disk controller 212. The disk controller 212 can interface to a hard drive 214, a floppy drive 216, an optical storage 218, and one or more storage devices 226. The I/O controller 210 can be configured to interface with one or more I/O devices, which can include a keyboard 202 and some other input device 204. The NIC 222 can couple the computer 200 to a network, such as the network shown in FIG. 1.

The various elements within the computer 200 can be coupled using one or more computer busses 228. The one or more storage devices 226 can include, but are not limited to, ROM, RAM, non-volatile RAM, flash memory, magnetic storage, optical storage, tape storage, hard disk storage, and the like, or some other form of processor readable medium.

The memory 208 and the storage devices 226 can include one or more processor readable instructions stored as software. The software can be configured to direct the processor 206 to perform some or all of the functions within the computer 200 within the system 100 of FIG. 1 or in subsequent figures. The software can include stand alone software executed by the processor 206, or the software can run within an operating system or within another software program. For example, the software can be a client application that can configure the computer 200 for operation within the system of FIG. 1.

Of course, not every computer 200 includes all of the modules or elements depicted in the embodiment of FIG. 2. Some of the elements can be optional and may be omitted. Other elements not shown can be added to the computer 200.

Figure 3:
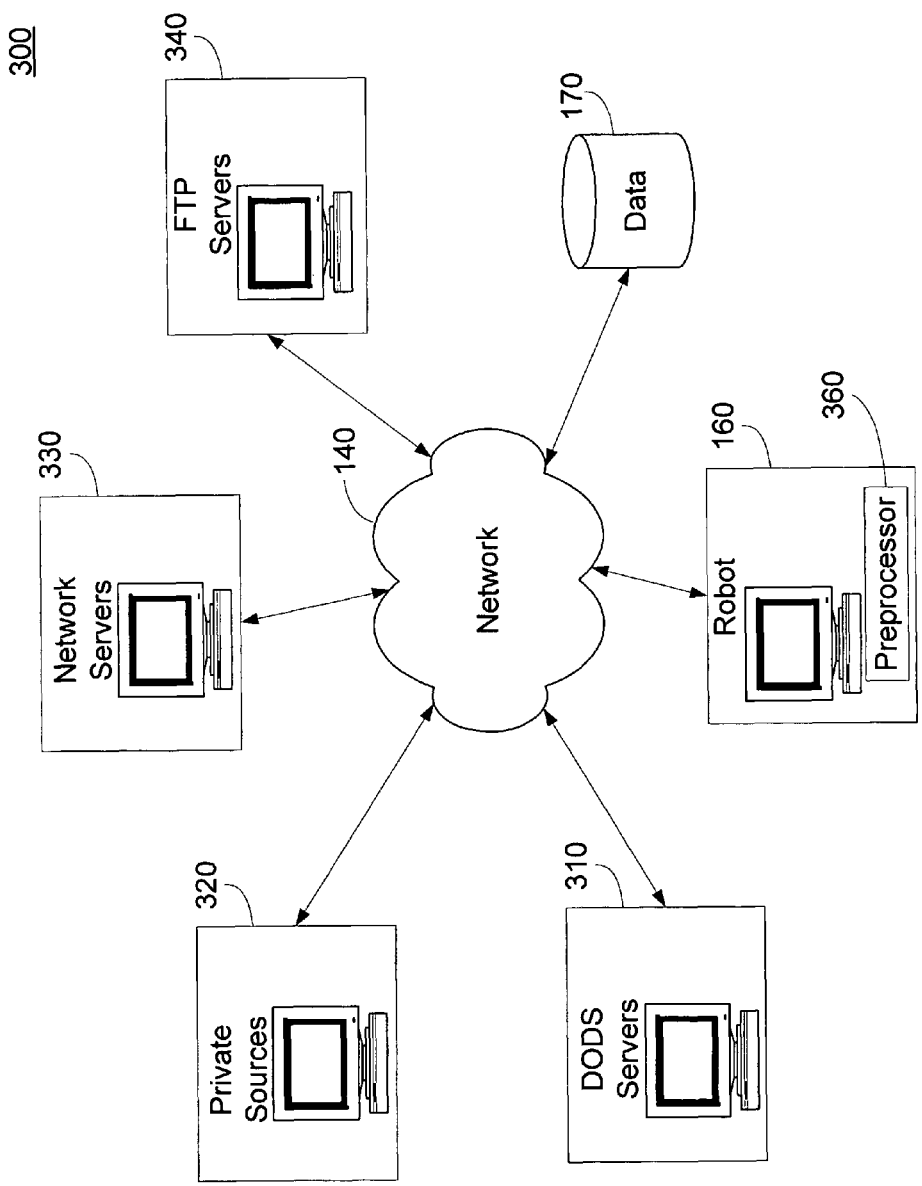
FIG. 3 is a functional block diagram of an embodiment of a information retrieval system.

FIG. 3 is a functional block diagram of an embodiment of a information retrieval system 300. The information retrieval system 300 is an example of a system by which a robot 160, that can be, for example, the network robot of the system of FIG. 1, can locate and retrieve information from the one or more data originating sources.

The data store 170 can be used to store all available content to minimize the time required to access the original data source and obtain the content. The content retrieved from the original data sources can be periodically updated to ensure that the data store 170 has an up to date version of the content.

In the information retrieval system 300 of FIG. 3, a robot 160 can be coupled to a network 140 and can be configured to crawl, search, or otherwise access relevant information from one or more originating data sources coupled to the network. As was the case with the system of FIG. 1, the network can include the Internet.

The originating data sources can include one or more Distributed Oceanographic Data System (DODS) server 310 that can be configured to store, for example, oceanographic data generated by one or more remote sources. The information from the one or more DODS server 310 can be accessed using a DODS protocol for requesting and transporting data across the network 140. The robot 160 can retrieve information from the DODS server 310 and store the information in the data store 170.

The originating data sources can also include one or more private sources 320 that are coupled to the network 140. The robot 160 can be configured, for example, to transmit one or more information requests to the private sources 320. Each source from the private sources 320 can be configured to respond to requests having a distinct protocol. Alternatively, multiple private sources may use the same or similar protocols.

In one embodiment, the robot 160 can request information from private sources 320 and the private sources 320 can provide the information to the robot 160, to the data store 170, or to some intermediate location (not shown) via email. In other embodiments, the private sources 320 may return the information using some other communication method, such as http, ftp, and the like.

The robot 160 can also search and retrieve information from one or more web servers or Internet servers 330. The robot 160 can be configured to crawl through one or more predetermined servers for information, or may be configured to successively crawl through substantially all available servers for desired information. Typically, the robot 160 accesses and retrieves information from the Internet servers 330 using a communication protocol such as http, although the robot 160 is not limited to any particular communication protocol.

The robot 160 can be configured to access and retrieve standard file types such as image files, text files, and html files. Additionally, the robot 160 can be configured to support the encapsulation and delivery of RSS data streams. RSS is a web based standard used on the Internet that is typically used to distribute dynamic information, such as news, sports scores, financial information, and other types of rapidly changing data. The standard specifies the use of XML and is distributed over the web using HTML GET requests.

Conventional RSS feeds are expensive to use over satellite connections because of the real time aspect of the feed. The dependence on the web typically requires users to be logged in and continually in communication with the Internet using a web browser to visualize the information. The robot 160 can be used to substantially remove the real time web dependency of RSS. The robot 160 can encapsulate the RSS feeds into static files that can be stored in the data store to be downloaded and displayed using the same information request protocol used for static files.

To encapsulate an RSS feed the robot 160 can download a predetermined RSS feed definition file to a server, that can be, for example, the server of the system of FIG. 1 or can be some other server. For each RSS feed the server can interpret the XML in the feed and build a text file containing the title, date, and discussion portion of the feed.

The robot 160 can also access one or more Internet servers that are configured as ftp servers 340. The ftp servers 340 can be configured, for example, to provide particular categories of files available for downloading. The robot 160 can, for example, transfer desired files from the ftp servers 340 to the data store 170 using the ftp communication protocol.

The robot 160 can optionally include a preprocessor module 360 that is configured to preprocess the files and information that is stored in the data store 170. For example, in one embodiment the robot 160 can convert the information from a first file format to a second file format before storing the information in the data store 170. In another embodiment, the preprocessor module 360 can compress the information and files stored in the data store 170 to reduce the size of the files. The preprocessor module 360 can be configured to perform compression based in part on the type of file stored within the data store 170. In still another embodiment, the preprocessor module 360 can be included in the data store 170 and can operate on information independent of the robot 160. In other embodiments, files and information stored in the data store 170 can be stored in their original file format and any compression or further processing can be performed by another device such as, for example, at the time the file is transmitted.

In one embodiment, each file in the data store 170 data base can be compressed with an optimum compression technique for the type of data. As an example, text and HTML files, for example, can be compressed with Burrows-Wheeler block sorting text compression algorithm, and Huffman coding (BZIP2). GIF images can be resampled to a smaller pixel size and then compressed using JPEG compression with a high compression and lower quality factor.

Figure 4:
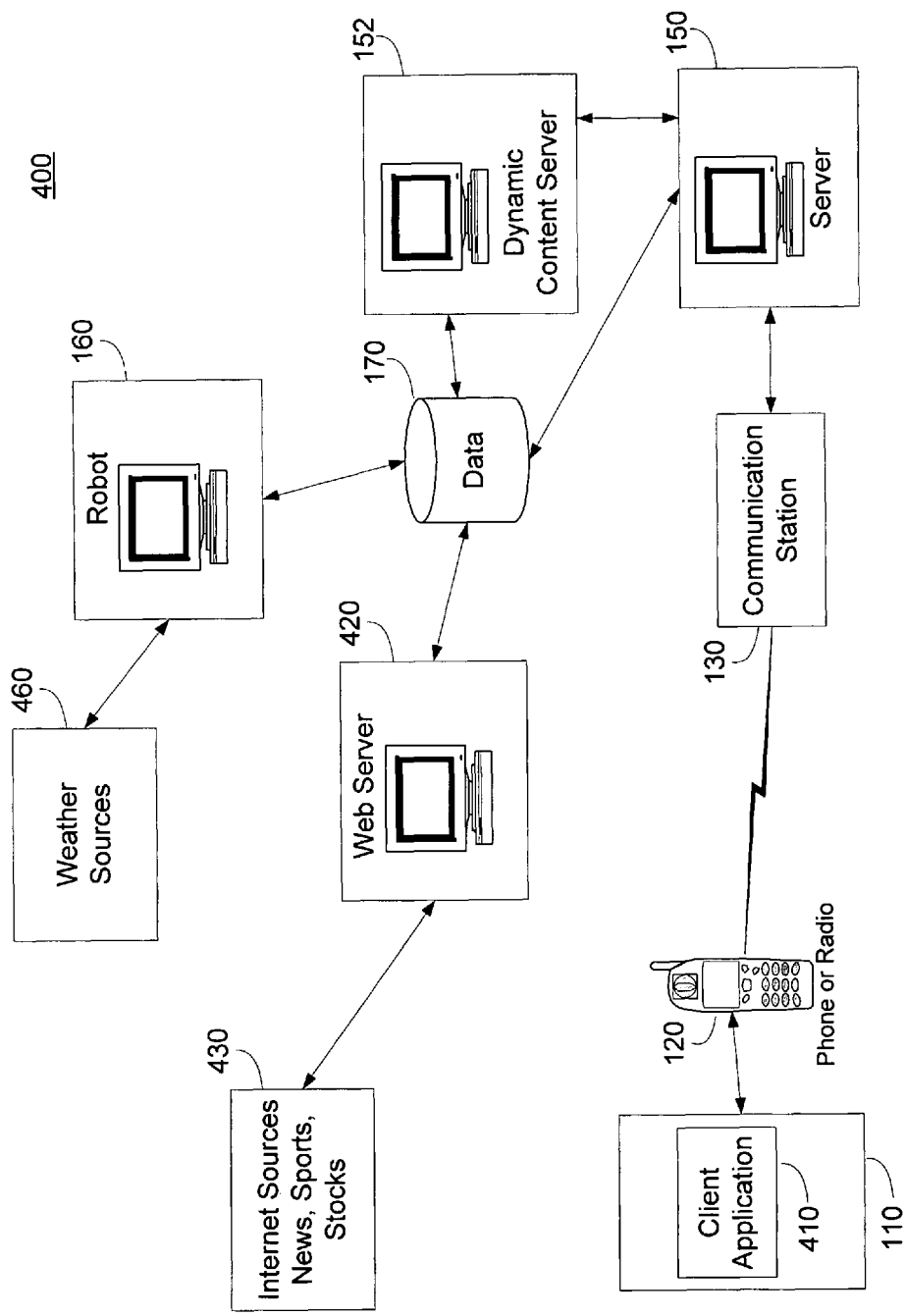
FIG. 4 is a functional block diagram of an embodiment of a system for delivery of information on demand.

FIG. 4 is a functional block diagram of another embodiment of a system 400 for delivery of information on demand.

The system 400 is similar to the system embodiment shown in FIG. 1. In the system 400 of FIG. 4, a client application 410 running within a user terminal 110 can be used to generate information requests, for example, in the form of a batch file that is transmitted to the server 150 via a user communication device 120 and communication station 130. To minimize costs associated with maintaining the connection to the server 150, the client application 410 can be configured to allow the user to generate the batch file or other form of information request off line. After the information request is generated, the user can initiate communication between the user terminal 110 and the server 150. In one embodiment, the client application 410 can be configured to initiate a connection between the user communication device 120 and communication station 130. Once the connection has been established, the client application 410 in the user terminal 110 can communicate the information request to the server 150 via the established connection.

The server 150 can access the data store 170 or a web server 420 for the desired information. The server 150 can be configured, via the information request, to preprocess the information. Alternatively or additionally, the server 150 can communicate requests for dynamic content contained within the information request to a dynamic content server 152. The dynamic content server 152 can access the data store 170 and retrieve one or more information files. The dynamic content server 152 can process the one or more information files to generate one or more dynamic information files corresponding to the dynamic content request. Thus, the dynamic content server 152 can process the stored information files to generate one or more dynamic information files corresponding to the dynamic content request, where the dynamic content request is not resident in the data store 170, but instead, is generated in response to the dynamic content request by the dynamic content server 152 from files stored in the data store 170.

For example, the server 150 can be configured to compress one or more of the information files according to a predetermined compression algorithm associated with each file type. The server 150 can then concatenate the information files, whether in their original format or processed format, and can transmit the information files back to the client application 410 in the user terminal 110 via the communication link between the communication station 130 and user communication device 120. The server 150 can issue a command or otherwise control the communication device 130 or user communication device 120 to terminate the communication link following the transmission of the final requested information file.

The server 150 can also track a cost associated with each information file retrieved and transmitted to the user terminal 110. The server 150 can determine a cost associated with filling the information request and can generate a bill or update a billing statement to include the delivery of the requested information.

The system 400 of FIG. 4 uses a separate web server 420 to handle receipt of some types of dynamic information, such as RSS feeds. As described above, the robot 160 can download a predetermined RSS feed definition file to the web server 420. For each RSS feed the web server 420 operates as the recipient of the feed. The web server 420 can interpret the XML in the RSS feed and build a static file from the RSS feed, that can be a text file containing the title, date, and discussion portion of the feed. The web server 420 can store the static file in the data store 170. The client application 410 in the user terminal 110 can then select an identifier corresponding to the RSS feed definition as one of the types of information desired. The server 150 can retrieve the static file from the data store 170 and deliver it to the client application 410. The requirements for an open connection can thus be eliminated from the RSS feed information.

As an example, for each element in a current RSS feed, the web server 420 can fetch a corresponding HTML page pointed to by the feed and download it using the HTTP protocol. The web server 420 can filter each downloaded HTML page and append it to the end of the static text file originally created by the robot 160. The resultant feed can be added to the database as available content. The database can also include a type of compression associated with the file. For example, a BZIP2 compression factor can be associated with the file. The encapsulated RSS feed can be delivered to a requesting client application 410 using the standard transfer protocol. Therefore, users can request, download, and view RSS feeds the same way they would any other available content in the data store 170.

Figure 5A:
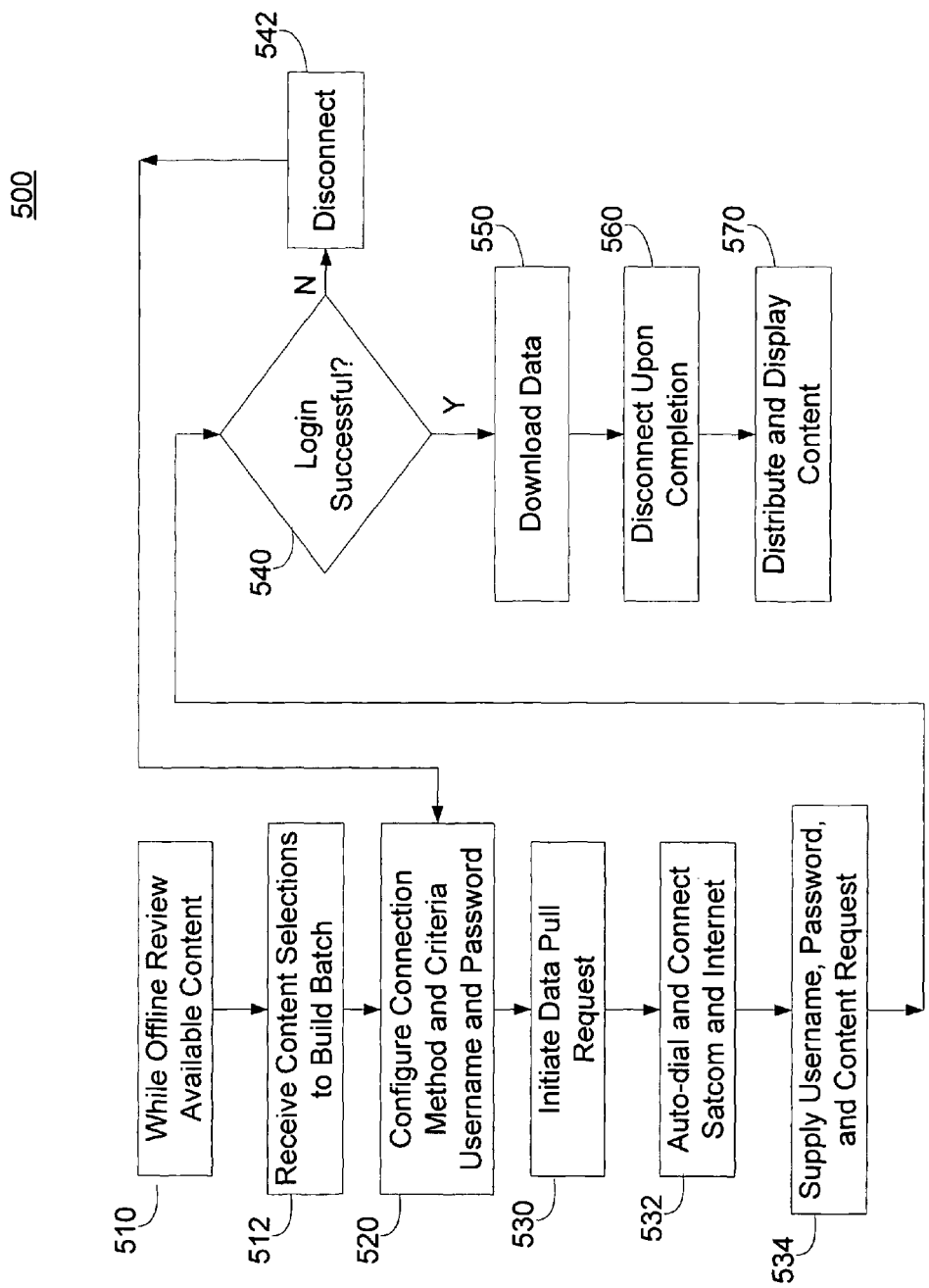
FIGS. 5A-5B are flowcharts of embodiments of data flow in an information delivery system.

FIG. 5A is a flowchart of a method 500 of an embodiment of data flow in an information delivery system. The method 500 can be implemented, for example, by a client application executing within the user terminal and in conjunction with the user communication device as shown in FIG. 4. The method 500 describes an embodiment in which the client requests content for immediate download. Additionally, the client application can request that one or more content be delivered according to a schedule, and can request that the content be delivered to a particular location, such as an email address.

The method begins at block 510 where a user interfacing with an interface of the client application reviews the content available from the system. To minimize connection costs, the system using, for example, the server, can communicate to the client application a list or catalog of available content. The content list can include, for example, a short description of each type of content and can include a price associated with the particular content. For example, the server can communicate a list of available weather content to the client application. The list can include, but is not limited to, GRIB, marine weather charts, ocean charts, satellite images, Nexrad, buoy current text, buoy graphs, ice information, text weather information, aviation weather information, interactive site specific charts and text forecasts, and the like, and some other types of content. The list can include a price associated with downloading each type of content. A user can browse through the content list while offline in order to minimize the connection time and the associated connection costs. For example, a remote marine vessel may use a satellite telephone to connect with the system, and the connection costs associated with using the satellite phone can be substantial.

The client application proceeds to block 512 and can receive an indication of desired content. In one embodiment, the client application can include a graphical user interface (GUI) to display a portion or all of the content list. The client application can configure the GUI to accept user content selections and can build a batch file having the user selections.

The client application proceeds to block 520 where it accepts user commands to configure a connection method and connection criteria. The client application and associated user terminal can be configured to use any one of a variety of methods for connecting with the system. For example, the user communication device shown in FIG. 1 can be a satellite telephone or terminal, a wired or wireless phone, a cellular phone, SSB/HF Pactor radio, an email interface, ISDN modem, DSL modem, or some other communication device.

The client application can also be configured to receive a username and password from the user. The username and password can be used to limit access to the system. The system can associate the username and password with an account to which charges for content download can be applied.

Once the content request and connection information have been received by the client application, the client application can proceed to block 530 and receive a user input initiating a data pull request. The client application can initiate the request to the system when requesting all of the content in the content request. Additionally, the client application can initiate a request to the system as a result of a loss of connection, corrupted content, or some other inability to completely receive the content corresponding to a content request.

The client application can include in the content request a flag or field that indicates whether the content request is an initial content request or a content request that is reinitiated as a result of some extraneous event. In one embodiment, the client application can include a data offset value with the content request, where the data offset value indicates the size of the content files corresponding to the content request that have already been downloaded or otherwise received. For initial content requests or for updated content requests where delivery of all of the content is requested, the client application can set the data offset value to zero. Similarly, if a content request is interrupted prior to delivery of all of the content, such as when the connection is dropped, the client application can determine the size of the content already delivered and include this value as the offset value. Therefore, in one embodiment, the client application can include a data offset value that indicates the number of bytes already downloaded corresponding to the current content request. The system can use the data offset value to initiate partial content delivery if the data offset value is greater than zero. The system can thus minimize connection times when data is requested as a result of a download interruption, such as a dropped connection.

The client application proceeds to block 532 and initiates the connection with the system. The client application can be configured to perform or otherwise control functions relating to establishing intermediate connections. For example, the client application can control a modem coupled to a satellite telephone and can instruct the satellite telephone to establish a connection with a terminal coupled to the system. For example, the client application can command the satellite telephone to connect to a modem of an Internet Service Provider (ISP).

The client application can also generate the commands or information required to establish the Internet connection using the ISP. For example, the ISP may require a username and password that is independent of the username and password used to access the content system.

After establishing a communication connection, the client application can proceed to block 534. At block 534, the client application can navigate to the server of the content system and log into the system, for example, by providing the username and password in response to a system prompt.

The client application proceeds to decision block 540 and determines if login was successful. If the login was not successful, the client application can receive from a server in the system a report or indication as to why the login was not successfully completed. Additionally, the system may automatically close the connection with the client application. For example, the server to which the client application is attempting to connect may disconnect the communication link by dropping the communication link.

In one embodiment, where a system server controls a communication station that communicates with the user communication device, the server may hang up the telephone link with the user communication device. The server can, for example, issue a hang-up command to an associated modem that results in the loss of the associated communication link. Alternatively, the server can issue a report to the client application and also command the client application to disconnect the communication link. For example, the server can command the client application to issue an hang-up command to the modem to hang up the associated user communication device. The client application proceeds to block 542 and disconnects the communication link. The client application can be configured to return to block 520 to allow the user to modify the connection methods, connection criteria, user name or password. Alternatively, the client application can determine that login was unsuccessful and proceed to block 542 where the client application determines a reason for the unsuccessful login and then disconnects the communication link to the system.

In another embodiment, where the user terminal is connected to the server using a wired connection, such as a TCP/IP connection, the server can report a login error and can close a socket associated with the connection if the login information is not correct.

Returning to decision block 540, if the client application determines that the login was successful, the client application proceeds to block 550 and downloads the requested content. The server can push the requested content to the user.

After all of the requested content is received by the client application, the client application proceeds to block 560 to disconnect the communication link to the system. The client application can automatically disconnect the communication link in order to minimize the connection time. For example, the client application can command a satellite phone that is used as the user communication device to hang up or otherwise go on-hook, or close a socket if communicating over a TCP/IP wired connection.

The client application proceeds to block 570 and downloading of the requested content is complete. The user can then use the client application to retrieve the downloaded content from a local storage and display or otherwise output the content. For example, the user can use the client application to view one or more charts or graphs that were downloaded as individual files.

The client application has the capability to request that the system automatically deliver content to a specified email address. The user selects the products to be delivered, enters the email address to which the products are to be delivered, specifies the frequency for the products to be delivered, and specifies the time of day of delivery. The content providing system creates an individual email for each piece of compressed weather content requested and forwards that compressed file to the selected email address at the requested time.

Auto-delivery extends the ease of use and access to content, but the delivery service also permits wired or wireless email service users to benefit from the wide array of content available through the system. Wired or wireless email service users can specify their email service address as the deliver to address. If a content file size exceeds a size limit, such as the 15 kb size limit restriction within SailMail, the system can notify the wireless email service user that this piece of content could not be delivered. The user will typically not be billed for any files that were too large to download through the wireless email system.

Figure 5B:
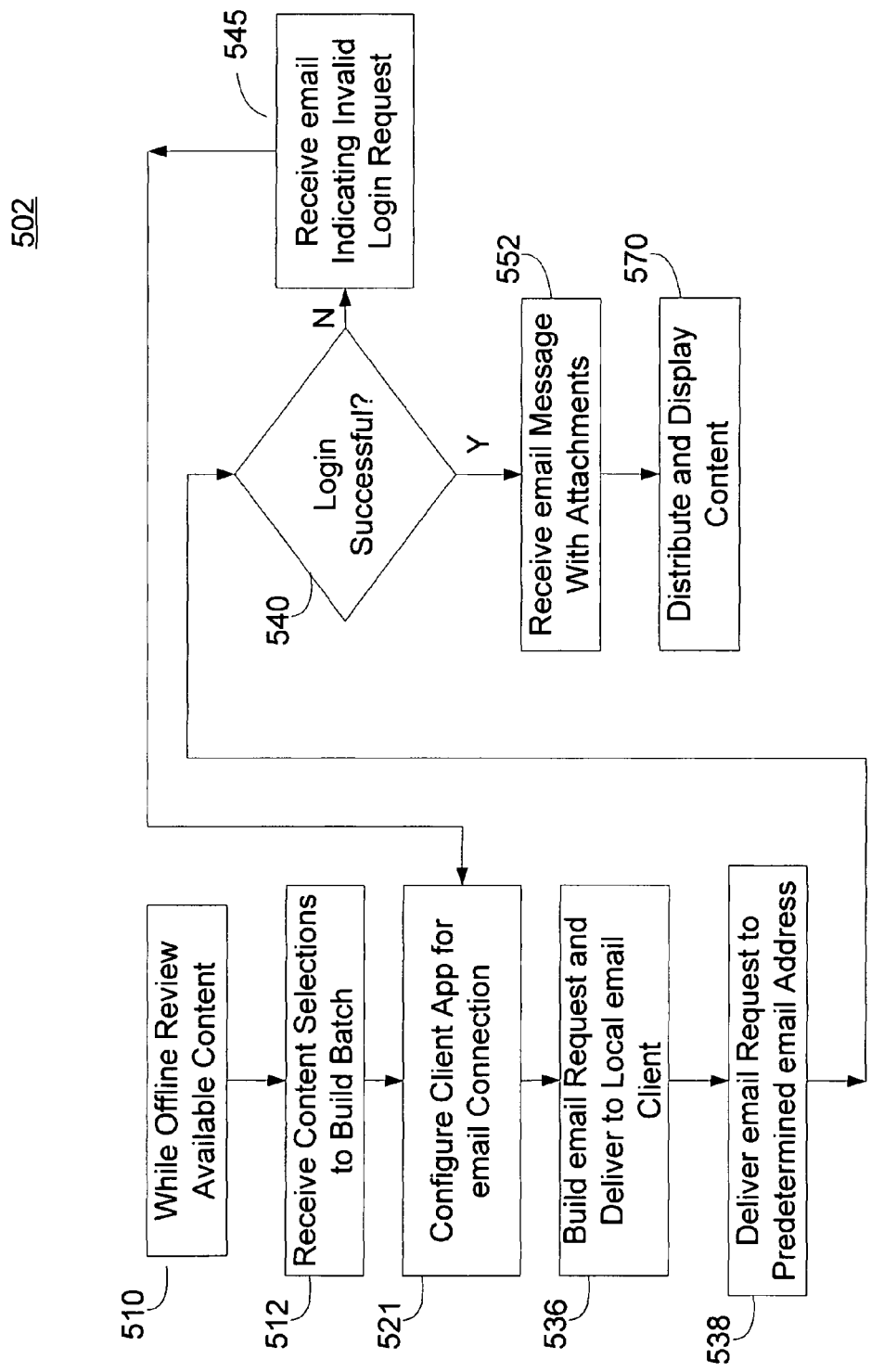

FIG. 5B is a flowchart of an embodiment of a method 502 of data flow in an information delivery system. The method 502 of FIG. 5B details a particular configuration where the client application requests information vi an email message transmitted to a predetermined content server address. The method 502 can be performed by the user terminal in conjunction with a client application and an email client that can be resident on or otherwise accessible by the user terminal.

As in the method of FIG. 5A, the client application, in block 510, can be configured to display available content on a user interface and a user can navigate a library of content displayed on the user interface. The client application can also be configured to receive one or more user content selections in block 512, as in the method of FIG. 5A.

The client application proceeds to block 521 and receives input from the user configuring the request for email connection. The client application can include in the user interface, the ability to configure the client application for email connection. The user interface can include for example, one or more configuration windows, toolbars, drop down menus, check boxes, and the like, that allow the user the ability to specify email as the connection type. The user interface can include one or more input fields that allow the user to input the user email address for information delivery and the local email client to use to transmit the email request. The client application can include a predetermined destination address that corresponds to a content server email address where the request is transmitted. In another embodiment, the user interface can include a list of multiple destination email addresses and allow the user to select the desired destination email address. The client application can also be configured to accept a username and corresponding password.

After the client application is configured for email connection, the client application can proceed to block 536 and build an email request for information and deliver the email request to the local email client. In one embodiment, the client application can generate the email request in response to a user initiating the request. For example, the user can select a 'GO' or 'START' button in the user interface and the client application can build the email request using the batch file of user selections and the username, password, and destination address from fields populated during the configuration of the email connection. The client application can also be configured to generate and include in the email request an auto-batch request. The auto batch request can allow the user to request, via the client application, for the information requested to be delivered periodically. The client application can receive input from the user indicating the period of delivery, such as hourly, at a specific hour of the day, weekly, or some other time period or event.

The client application can communicate the email request to an email client, such as the default email application on the user terminal. The user terminal proceeds to block 538 where the email client delivers the email request to the predetermined email address. Once the client application communicates the email request to the email client, the email client can operate on the message in the same manner as typical email messages.

The client application can proceed to decision block 540 to determine if the login included in the email request was successfully processed by the content server. The client application typically does not have direct visibility into the operations of the content server, and can determine if the login was successfully processed based on the response issued by the content server.

If the login was not successful, the user terminal or client application proceeds to block 545 where it receives an email message from the content server indicating an invalid or otherwise unsuccessful login attempt. Alternatively, if the login was successfully processed, the user terminal can receive the requested information or content as one or more attachments to one or more email messages. In one embodiment, the user terminal receives a single attachment file representing requested information in each email message sent by the content server. Thus, the user terminal can receive a plurality of email messages corresponding to the plurality of requested information.

After receiving the one or more email messages from the content server, the user terminal can proceed to block 570 where the user can review or otherwise process the attachments in a manner provided by the email client or user terminal. For example, the user terminal can be configured to open particular file types with associated applications. For example, graphic images may be viewed using a default graphic viewer while text files can be viewed with a particular text application.

Figure 6A:
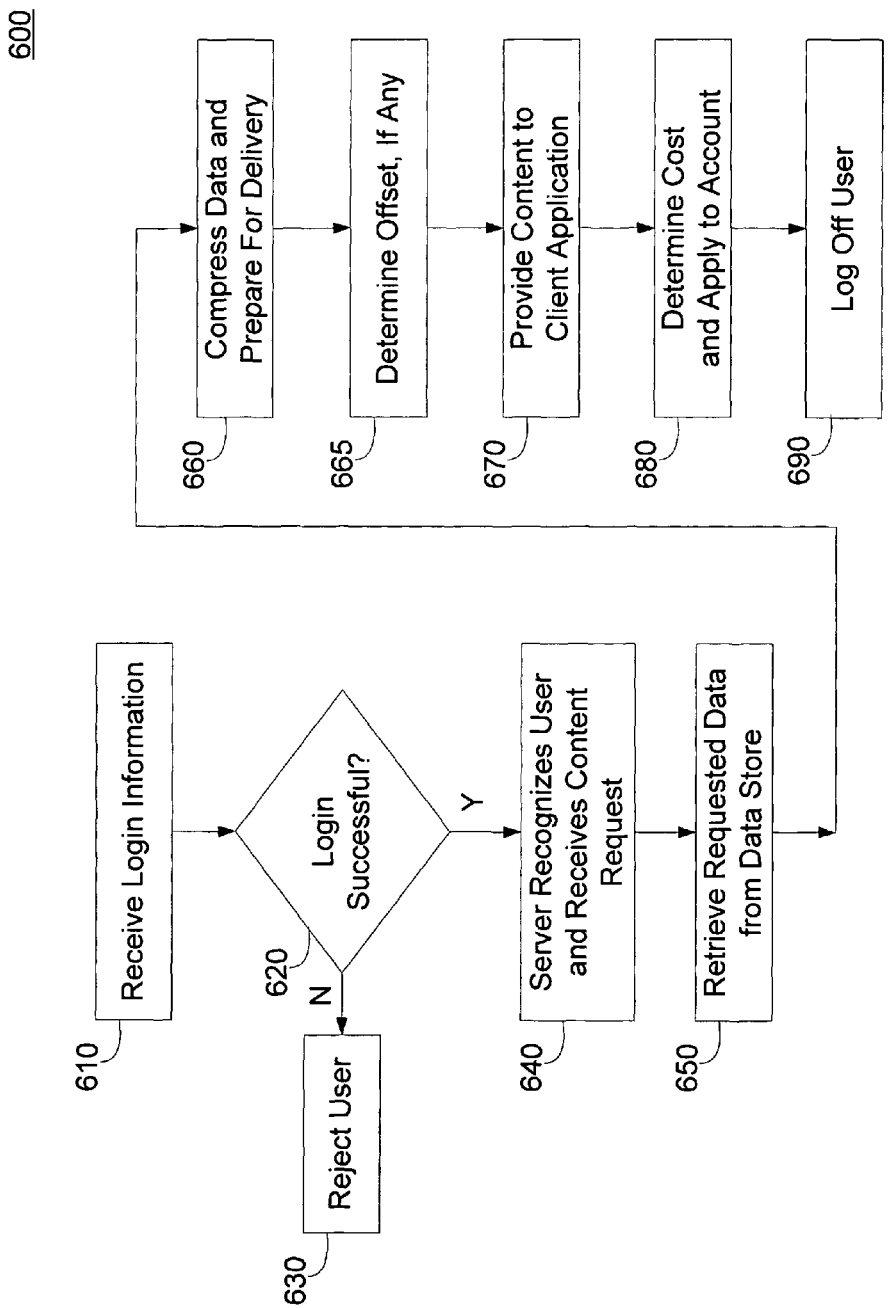
FIGS. 6A-6C are flowcharts of embodiments of data flow in an information delivery system.

FIG. 6A is a flowchart of an embodiment of data flow process 600 in an information delivery system. The system can be, for example, the system of FIG. 1 or FIG. 4 and can be the system that communicates via the user communication device with the client application executing on the user terminal.

The process 600 begins at block 610 when a server in the system receives a login request having log in information such as a username and a password. For example, the server can be an Internet server and can display a web page having one or more text boxes configured to accept user login information.

The server proceeds to decision block 620 and determines if the login information is valid and whether to grant access to the user. If the server determine that the login information is invalid or otherwise not acceptable, the server proceeds to block 630 and rejects the user login request. The server may optionally send a command to the client application to terminate the communication link.

Returning to decision block 620, if the server determines that the login information is valid, the server proceeds to block 640 and recognizes the user and receives any content request that is transmitted by the client application. The server can recognize the user, for example, by transmitting an acknowledge message. Alternatively, the server may acknowledge the user by fulfilling the request for content and not transmitting a rejection message in response to the login.

After receiving the content request, the server proceeds to block 650 to fulfill the request. The server can access an associated data store to retrieve the content requested in the content request by the user. The server can proceed to block 660 and format the content in the manner requested by the user. In one embodiment, the server can have a default mode where it compresses each of the content files in a predetermined manner that may be distinct for the type of information contained in the file.

However, the content request may include an indication that requests that one or more of the content files not be compressed. For example, a user may request that a particular graphic image file not be compressed because the user wishes for the delivered graphic image to have the same resolution as the original image. Therefore, the server may selectively compress the content files based on the direction provided in the content request.

The server proceeds to block 665 and determines whether the content request included an offset value. The content request received from the client application can include an offset value if the content request is a retransmission request, such as in the case where a previous request was interrupted or otherwise unsuccessful. The server can use the offset value to determine the amount of content that was previously received by the client application. In one embodiment, the server can determine that the starting point for transmitting the requested content to be the offset value. In another embodiment, the server can determine that the starting point for begin transmitting the requested content to be at the beginning of the first content file that was not completely received by the client application in the earlier transmission. That is, the starting point corresponds to the beginning of the content file that spans the offset value.

The server proceeds to block 670 and transmits the requested files to the client application in the user terminal generating the request. The server can transmit all of the content files or can transmit only a portion of the content files based on the offset value. Additionally, to minimize the connection time required to transmit the content files to the client application, the server can be configured to transmit the content files without requiring any acknowledgement from the client application.

Binary data transfers over satellite phones using internet protocols such as ftp are relatively slow. There are two primary reasons for the lack of performance of conventional internet protocols. The first is limited bandwidth and the second is latencies in the communication link.

Satellite terminal based data connections are relatively slow compared to the bandwidths achievable over terrestrial based communication links or even cellular telephone based communication links. Satellite data services from Globalstar™ satellite telephones, for example, run at 9600 baud while communication links over Iridium™ satellite telephones run at 2400 baud. Conventional internet protocols were designed to run over connections with much higher bandwidth and therefore do not compress the data before transmitting it. Considerable gains in effective baud rate can be achieved by compressing the data before transmitting it.

The second factor affecting performance is latency inherent in satellite based technology. Satellites in earth orbit are a considerable distance from earth. When communicating through these devices the time of flight for data transfer is considerable. Most internet protocols are quite chatty by nature. Protocols such as ftp typically send a burst of data and then wait for the remote machine to respond with an acknowledgment before proceeding with the transfer of the next data packet. The latencies in the satellite medium cause the requirement for numerous acknowledgement messages to drastically reduce the performance of these protocols. In most instances delays caused by latencies are greater than any gains obtained by compressing the data. To use satellite bandwidth effectively it is important, therefore, to reduce the number of line turn arounds, characterized by acknowledgement messages, in the communications protocol. Fewer line turn arounds or acknowledgement messages in the protocol translate directly into faster effective transfer rates.

After transmitting the content to the client application, the server proceeds to block 680 and determines the cost associated with the content delivery. Each of the content files can have an associated cost, and the cost of delivering the content in response to the content request can be determined as the sum of the costs associated with each of the content files. The cost can then be applied to a user account corresponding to the username that was used to log into the system. The server can determine if the content files are being retransmitted based on an earlier unsuccessful transmission and may not charge the account for the retransmission. In other embodiments, the server may determine a reduced cost for retransmissions that is based on a percentage of the sum of the costs associated with each of the transmitted content.

The server optionally proceeds to block 690 and logs the user out of the system after completing the content transfer. In some embodiments, the server can transmit a command to the client application to log out and disconnect the communication link with the server after completing the transfer of the requested content. In other embodiments, the server may omit this step and allow the client application to control log off and disconnection.

To support auto-delivery, the system can receive from a valid user, a content request specifying the content, email address, delivery frequency, and delivery time for content delivery. The server can log the delivery information in memory and proceed at block 650 at each time that the content is scheduled for delivery. The auto-delivery request can be processed by the server as a successfully received content request.

Figure 6B:
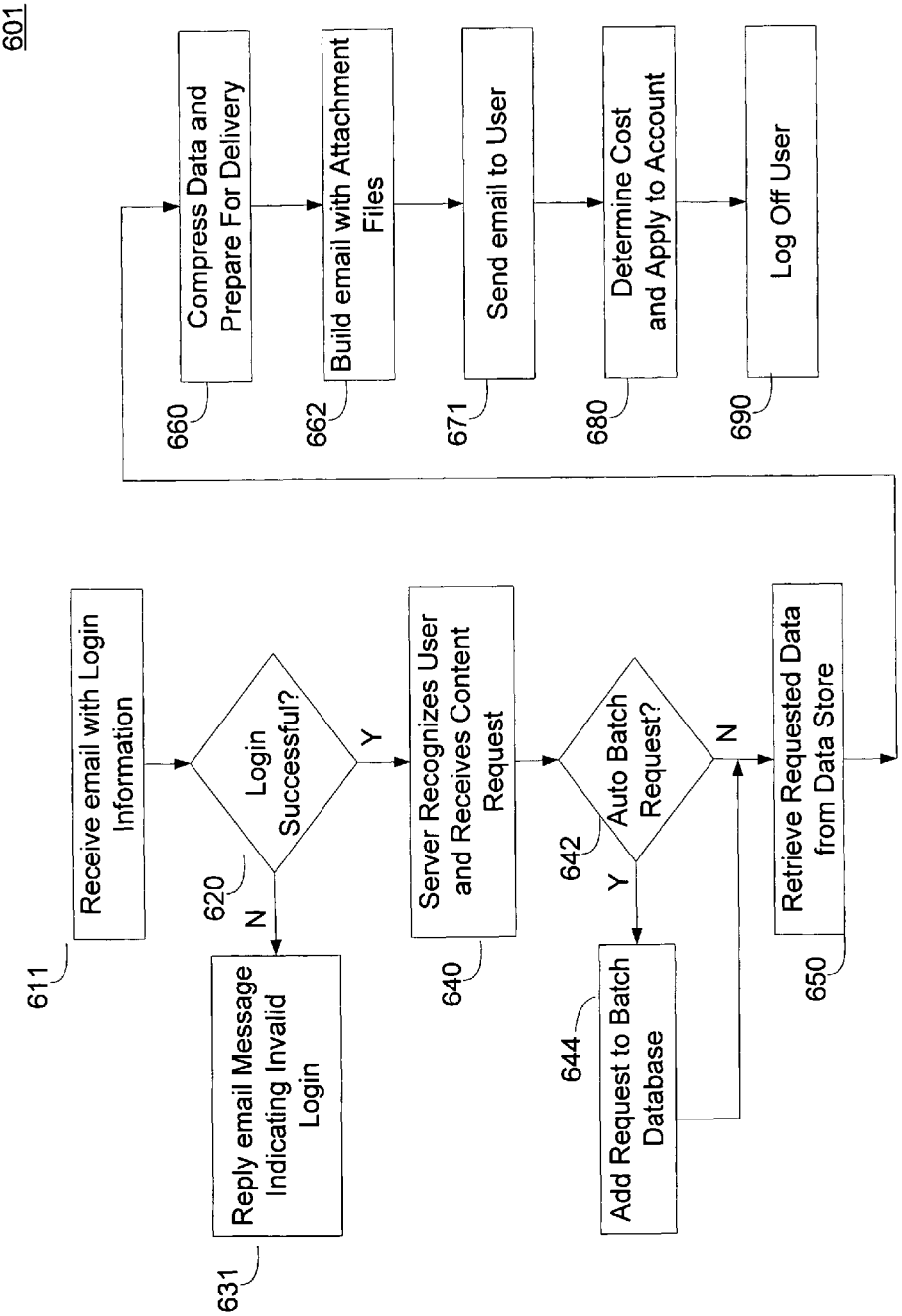

FIG. 6B is a flowchart of an embodiment of a method 601 of data flow in an information delivery system. The method 601 can represent a particular embodiment of the process of FIG. 6A where the user terminal transmits an email request and the server generates and delivers to the user terminal one or more email messages in response to the email request.

The method 601 begins at block 611 where the content server receives an email request having login information. The content server can receive the email message, for example, at one or more predefined email addresses.

After receiving the email request, the server proceeds to decision block 620 to determine if the email request corresponds to an authorized user. The server can, for example, compare the username and password included in the email request to a database of authorized users.

If the login is not successful, the server can proceed to block 621 where the server generates a reply to the email request indicating receipt of an invalid login. The method 601 is then complete.

If, at decision block 620, the server determines that the login was successful, the server proceeds to block 640 and recognizes the user, receives the content request, and begins processing the content request. The server proceeds to decision block 642 and determines if the email request includes a batch request, where the user terminal can request scheduled delivery of the requested content.

If a batch request is included in the request, the server proceeds to block 644 and adds the request to a batch database that tracks the scheduled deliveries. The server proceeds to block 650 once the batch request is added to the batch database.

Returning to decision block 642, the server proceeds to block 650 if the request does not include a batch request. At block 650, the server retrieves the requested information and proceeds to optional block 660 where the retrieved information files can be compressed based on user preference.

The server proceeds to block 662 and builds one or more email messages directed to the email address in the reply field of the email request. Each email message can include one or more attachments corresponding to the requested information.

The server proceeds to block 671 and delivers each email message to the requesting user by sending the email messages to the user. The server then proceeds to block 680 and can determine a cost associated with fulfilling the request. The cost can be applied to a corresponding user account. The server can the log the user off. In one embodiment, the server logs off the user by merely completing the processing associated with the user request.

Figure 6C:
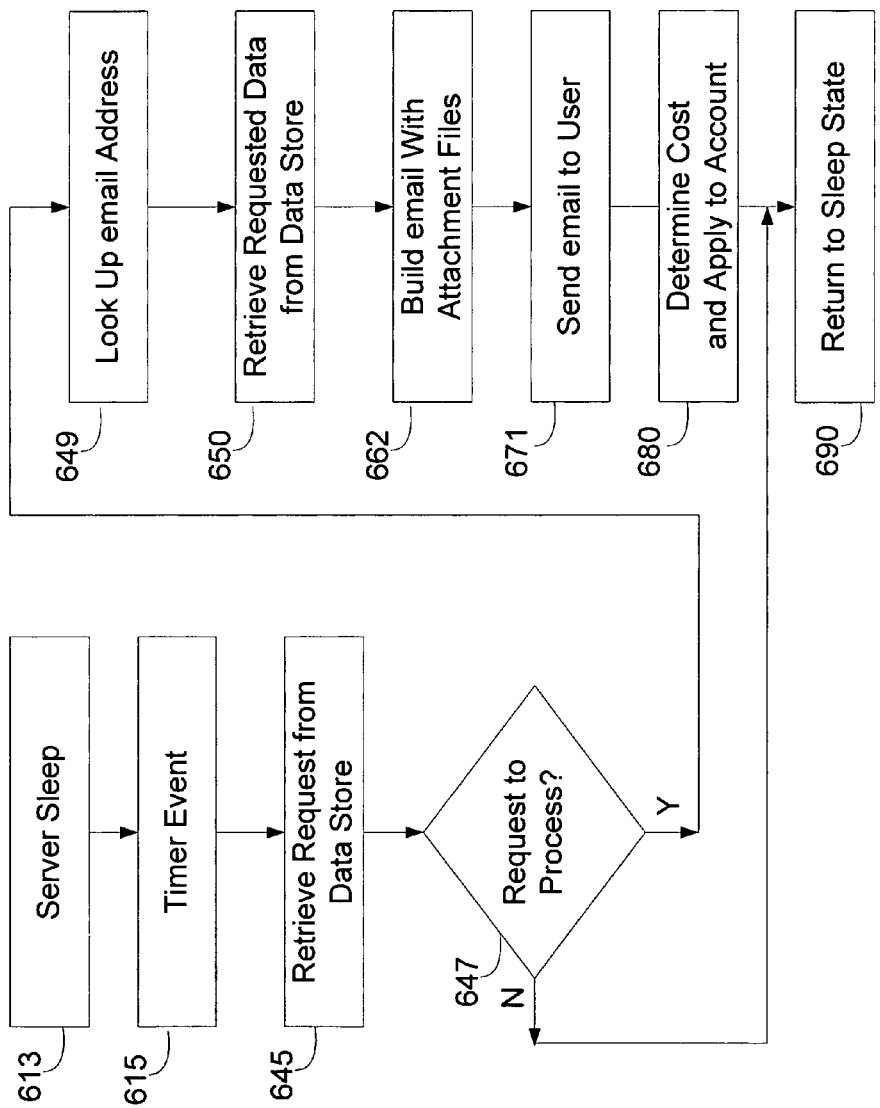

FIG. 6C is a flowchart of an embodiment of a method 602 of data flow in an information delivery system. The method 602 details system support for an auto batch request, such as the auto batch request that can be include in an email request.

The method 602 can be implemented on a server that is configured to support servicing of auto batch requests and can be the server of FIG. 1.

The method 602 begins at block 613 with the server in a sleep mode. A sleep mode can correspond to any mode in which the server is not actively supporting batch requests. Thus, the server can be actively supporting other applications, but may be considered to be in the sleep mode for the purposes of the method 602.

The server proceeds to block 615 where a timer event can trigger the server to awaken from the sleep mode. The timer event can be, for example, an interrupt that periodically occurs and triggers the server to awaken from the sleep mode. The timer event can be configured to trigger the server in increments of seconds, such as every 5 seconds, 10 seconds, 15 seconds, 1 minute, or some other predefined increment of time.

After receipt of the timer event, the server can proceed to block 645 and access the batch database to retrieve active batch requests. The server proceeds to decision block 647 and can determine if there is a batch request scheduled for the time corresponding to the present timer event. If not, there is not batch request scheduled for the present time and the server proceeds to block 690 and goes back to sleep.

If, at decision block 647 the server determines that there are one or more batch requests scheduled for the present time, the server proceed to block 649 and looks up the email address corresponding to the batch request. The server can then fulfill the scheduled request in virtually the same manner as for an immediate request for information.

The server proceeds to block 650 and retrieves the requested data from the data store. The server proceeds to block 662 and builds one or more email messages having the requested data as attachment files to the email messages. The server can proceed to block 671 and email the one or more email messages to the requesting user at the specified email address.

The server proceeds to block 680 to determine the cost and apply the cost to the corresponding user account. The server then proceeds to block 690 to return to the sleep mode.

Example

Weather Content Retrieval

FIGS. 7 through 14 illustrate an example of an embodiment of a user interface and of navigating through a user interface to generate a content request for weather content and submitting the content request to a system for fulfillment. FIGS. 15 through 20 illustrate examples of weather content that can be delivered to the client application based on a content request. Although the example illustrates selection and downloading of weather content, a similar configuration can exist for other types of content, including sports, stock, and RSS content.

Figure 7:
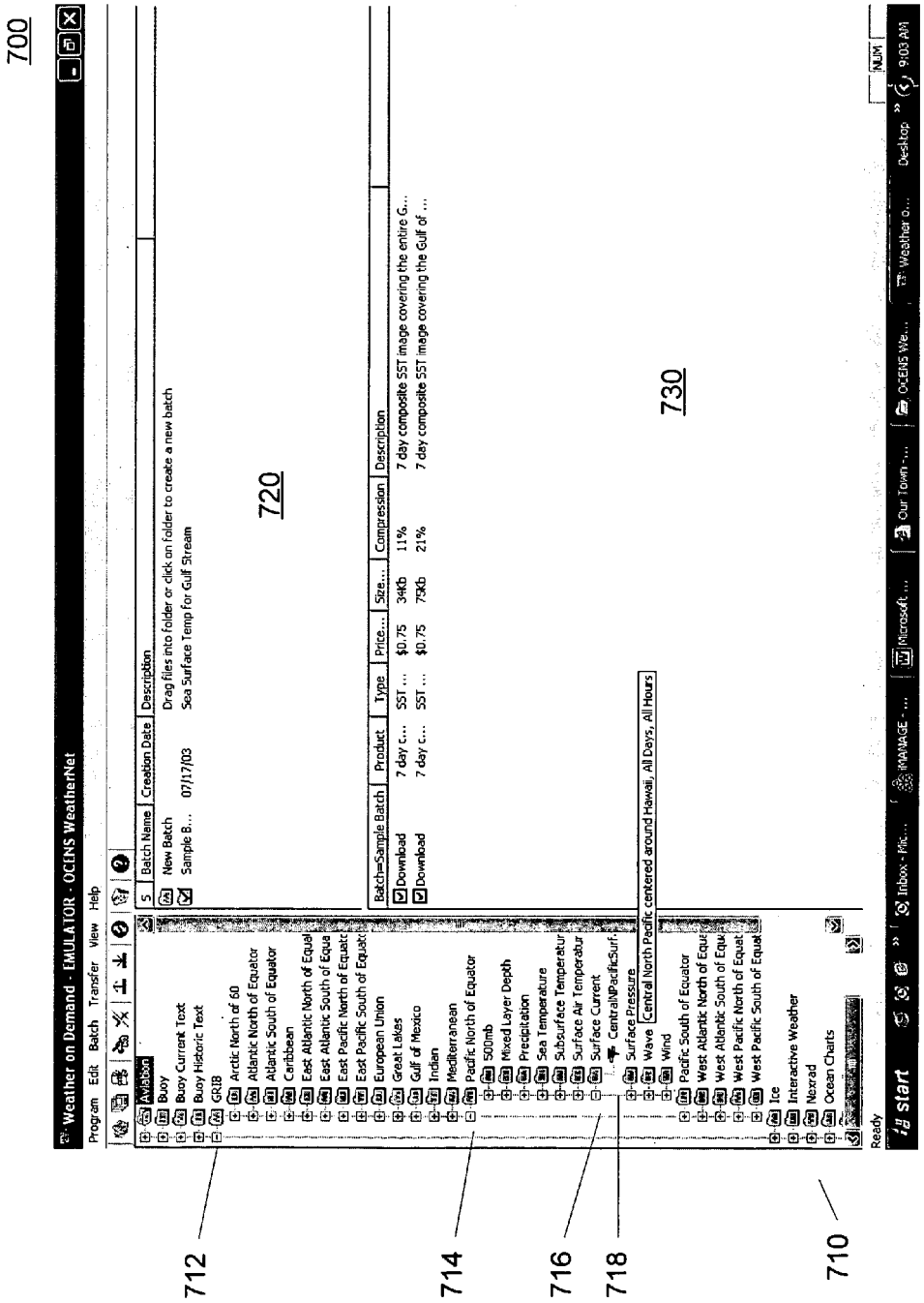
FIG. 7 is a screen image from an embodiment of a client application.

FIG. 7 is a screen image of an embodiment of a user interface 700 from a client application. The user interface 700 is divided into three primary elements. The three primary elements can include a content section 710, a batch section 720, and a details section 730.

The content section 710, positioned on the left hand side of the user interface 700 in this embodiment, includes a listing of some or all of the content available from the system. As shown in the content section 710, the content can be organized in a hierarchy of folders. The content section 710 of the embodiment of FIG. 7 is configured to show the weather-related content that can be supplied by the system. The weather-related content can include, but is not limited to, aviation, buoy, buoy current text, buoy historic text, GRIB, ice, NEXRAD, ocean charts, satellite images, text, and weather charts.

Aviation content can include weather, wind and temperature, upper air and surface analysis charts. The system may update this information at a periodic interval, such as every three hours. The system can update the information at substantially the same interval that the information is updated at the originating site or can update the information at a less frequent interval.

Buoy content can include graphs of the five day trend for buoy measured atmospheric pressure, wave period, wave height, wind direction, and wind speed. Buoy information can also be updated as frequently as once each three hours.

Buoy current text content can include the most recent hour text report of buoy measured atmospheric pressure, wave period, wave height, wind direction, and wind speed. Similarly, buoy historic text content can include the most recent 1000 hours or six weeks of buoy measured atmospheric pressure, wave period, wave height, wind direction, and wind speed.

GRIB (Gridded Binary) data reports can include gridded binary reports for 500 mb, surface pressure, surface air temperature, wind speed and direction, wave height and period, sea temperature, sub-surface temperature, currents, salinity, and or some other type of data. The GRIB content can be updated twice daily and each run can produce forecasts at 6 hourly intervals from 0 to 120 hours.

Ice content can include charts of ice extent and thickness for North and South polar regions and can be updated daily. NEXRAD content can include composite short and long range reflectivity images and can be updated every ten minutes. Ocean chart content can include sea temperature, sea surface height, and current velocity charts and can be updated every three hours. Satellite image content can include visible, infrared, water vapor and weather charts in satellite images and can be updated every thirty minutes. Weather chart content can include charts of 500 mb, surface analysis, wind, wave, and sea state, and can be updated every three hours.

Each of the folders in the content section 710 can be arranged in a hierarchy with the top level folder identifying the content type and the next lower level of folders identifying regions for which the content is available. Additional folders may further provide additional sub-categories until the lowest level, where the actual content identifiers are located. For example, the GRIB folder 712 can be expanded to regional folders that includes the Pacific North of Equator folder 714. Similarly, the Pacific North of Equator folder 714 can be expanded to include folders identifying the type of content, including a folder for Surface Current 716. The Surface Current folder 716 can be expanded to show one or more content files. In the example shown in FIG. 7, the Surface Current folder 716 includes only one content file, the Central North Pacific centered around Hawaii, All Days, All Hours content file 718.

The batch section 720 can include information relating to batch files representing content requests. The batch files can each include properties that may be configured by the user. The batch file properties can include the name of the batch file, a short description of the batch file, a transfer folder that identifies a destination folder into which the system deposits the delivered content, a download run property that can indicate whether a particular application is to be run any time a particular type of content file is received, an application property that identifies a path to an application that the user can configure to be automatically launched, an arguments property that indicates whether the application will accept and respond to arguments (files) from an external source without user intervention.

If the folder associated with a batch file is identified with a check, the batch is active and the content request will be submitted and the requested contents received when the download control button is selected. Thus, one or more batch files may be created and a plurality of batch files may be activated. The plurality of batch files may initiate the receipt of multiple content corresponding to each of the content requests.

The details section 730 can include the content files and properties relating to the content files associated with a batch file in the batch section 720. Each content file scan be individually enabled or disabled for download by checking or unchecking a download box associated with the content file. This feature allows a user to create a primary batch file having all of the preferred content yet allows the user to de-select one or more content files that are not desired at every session. The properties can also include a product name associated with the content. The product name corresponds to the name in the category library used to select the content. A type identifier indicates the chart type. For example, the type identifier can indicate a surface analysis, visible satellite image, composite long range reflectivity, or some other type of chart type.

A price property can indicate a price associated with receiving the content. Typically, the price is billed to the users account each time the client application downloads the content file. A size property indicates in kilobytes a compressed size of a content file. The compressed file represents the file that is downloaded in response to a content request unless the user desires an uncompressed version by selecting the "Disable Compression" option.

A compression property indicates the percentage compression achieved by compressing the original file. The percentages are relative to the original uncompressed file size. A compression factor of 100% represents a file size that is equal to the original file size, whereas a compression factor of 10% represents a compressed file that is 10% of the original file size. A description property includes a description of the associated content.

Figure 8:
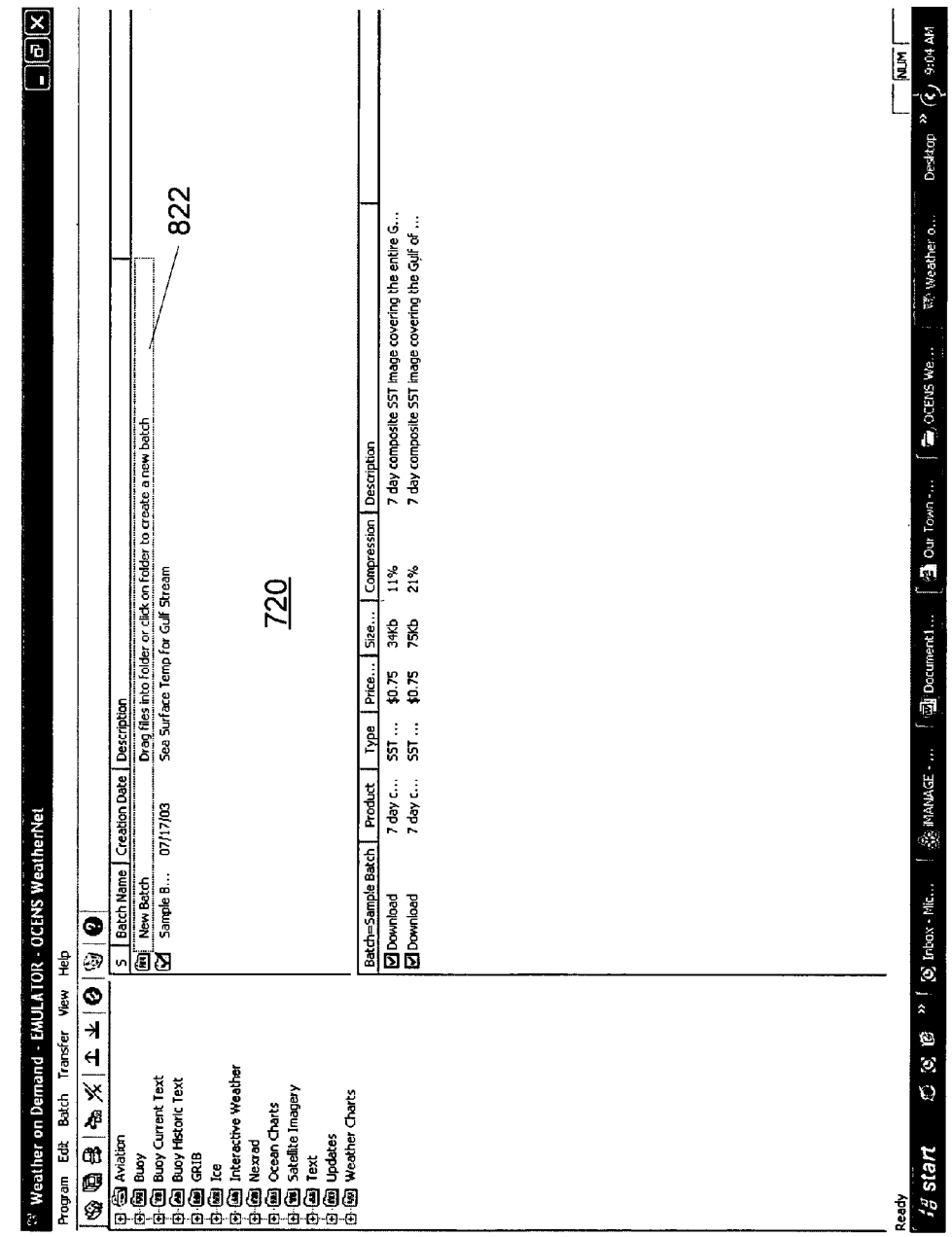
FIG. 8 is a screen image from an embodiment of a client application.

FIG. 8 is a screen image of an embodiment of the user interface 700 of the client application illustrating initial steps for building a batch file to generate a content request. To build a new batch file corresponding to a content request, the user can initially select a New Batch folder 822 in the batch section 720 of the user interface 700.

Figure 9:
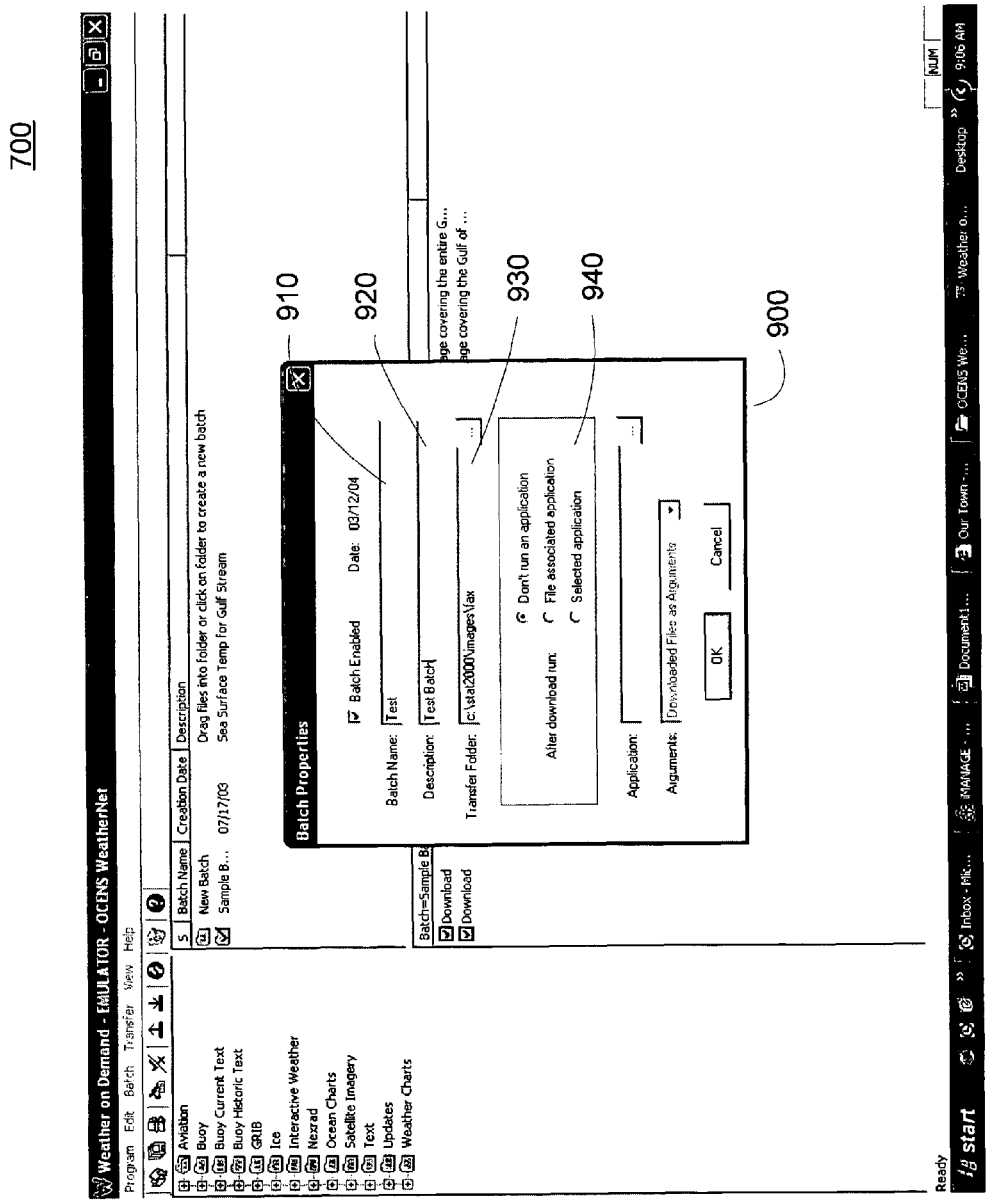
FIG. 9 is a screen image from an embodiment of a client application.

FIG. 9 shows a screen image of the user interface 700 after selecting the New Batch folder 822. A batch properties dialog box 900 opens to allow the user to configure properties of the new batch file. The batch properties dialog box 900 can include a batch name field 910 that is configured to accept a name for the new batch file. In the example of FIG. 9, the batch name field 910 has the name "Test." A description field 920 allows the user to enter a description of the batch file. The description field 920 of FIG. 9 shows that the batch is a Test Batch.

A transfer folder field 930 identifies a folder accessible by the client application where the downloaded content is to be stored. A default folder can be configured by the client application, but the user has the opportunity to change the folder, whether on a batch file basis or a global basis.

An After Download Run field 940 allows the user to select whether to automatically start a particular application based on a selected application, an application affiliated with a file type, or no application. Once the user has configured the fields of the batch properties dialog box 900, the user can accept the entries and proceed with defining the contents of the batch.

Figure 10:
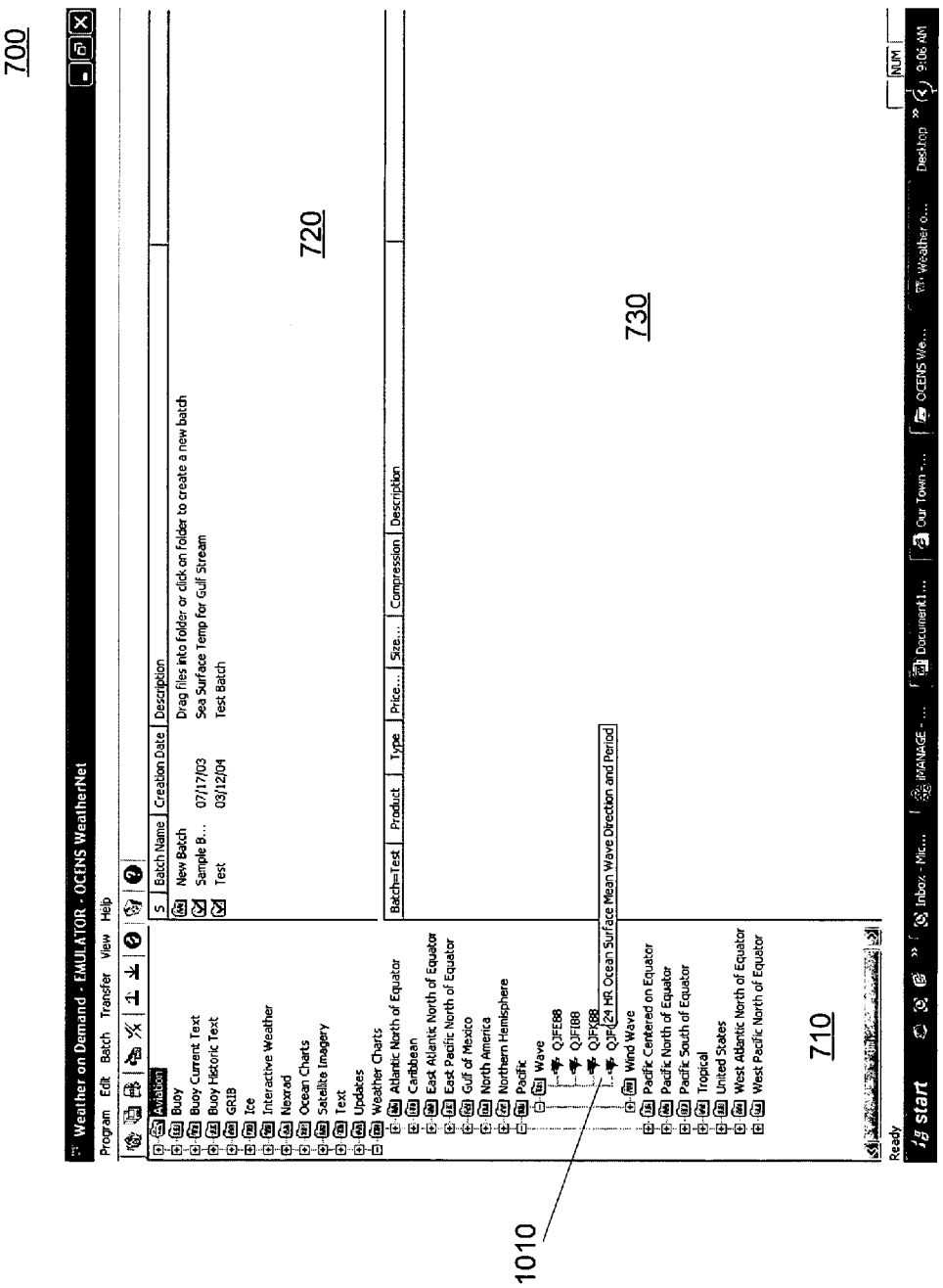
FIG. 10 is a screen image from an embodiment of a client application.

FIG. 10 is a screen image of the user interface 700 showing a steps that a user can execute when building a batch file. The user can navigate the content in the content section 710 to identify a particular content that is to be requested in the batch file. In the example of FIG. 10, the user has navigated to a weather chart in the pacific region that corresponds to wave information. In particular, a content file corresponding to 24 HR Ocean Surface Mean Wave Direction and Period 1010 is selected. The user can add the highlighted content to the batch file by selecting the content and dragging it to the details section 730 associated with the batch file.

Figure 11:
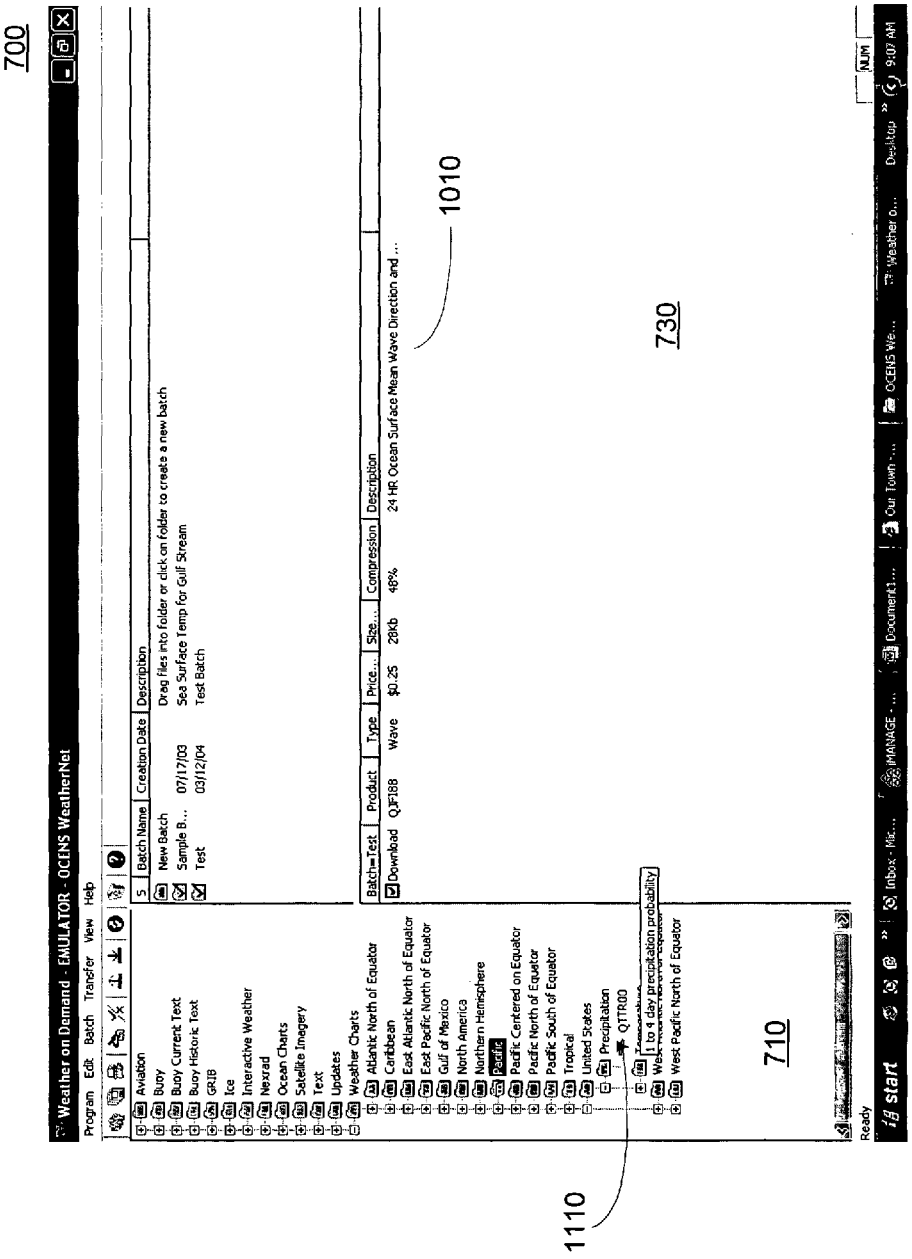
FIG. 11 is a screen image from an embodiment of a client application.

FIG. 11 shows a screen image of the user interface 700 where the 24 HR Ocean Surface Mean Wave Direction and Period content 1010 is added to the details section 730 of the batch file and a 1-4 day precipitation probability content 1110 is selected for addition to the batch file.

Figure 12:
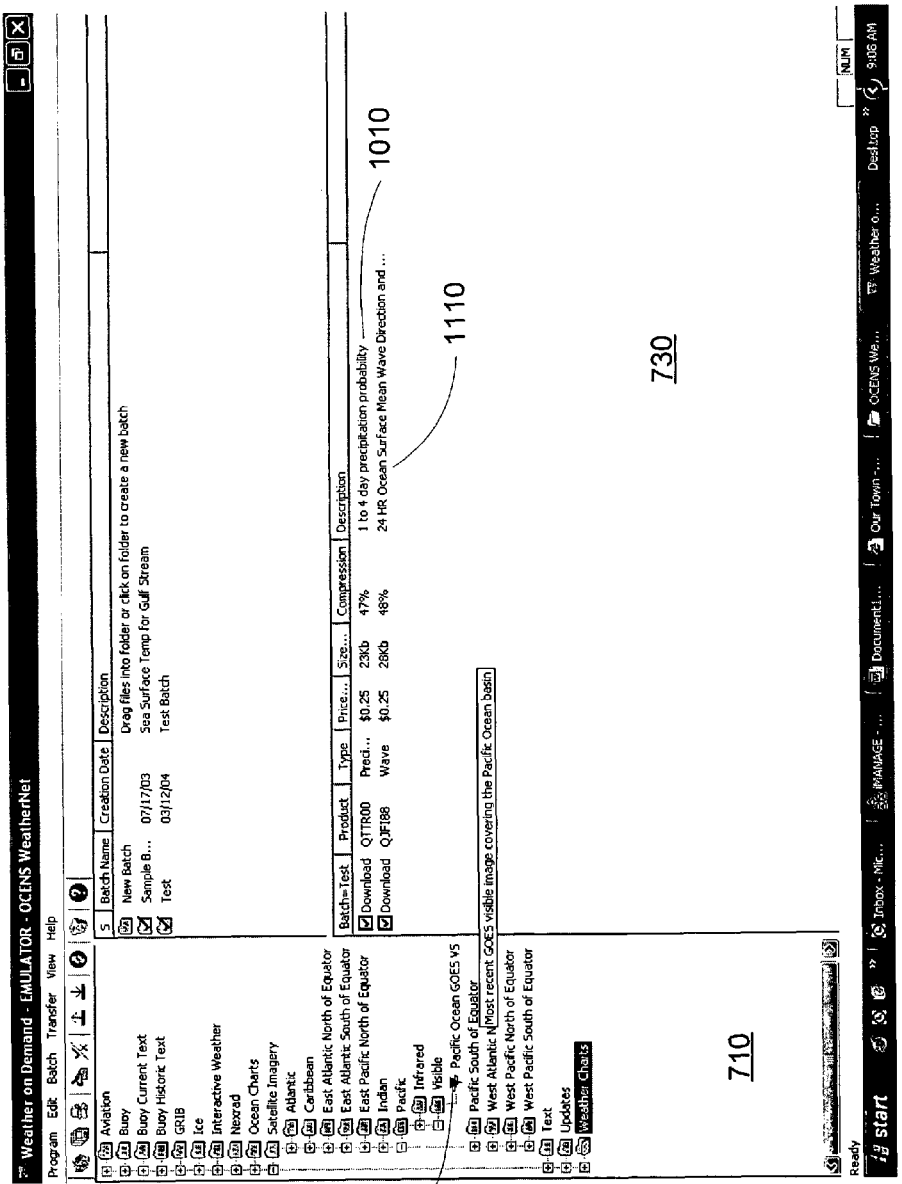
FIG. 12 is a screen image from an embodiment of a client application.

FIG. 12 shows a screen image of the user interface 700 where the 1-4 day precipitation probability content 1110 is added to the details section 730 of the batch file and a Most recent GOES visible image content 1210 is selected for addition to the batch file.

Figure 13:
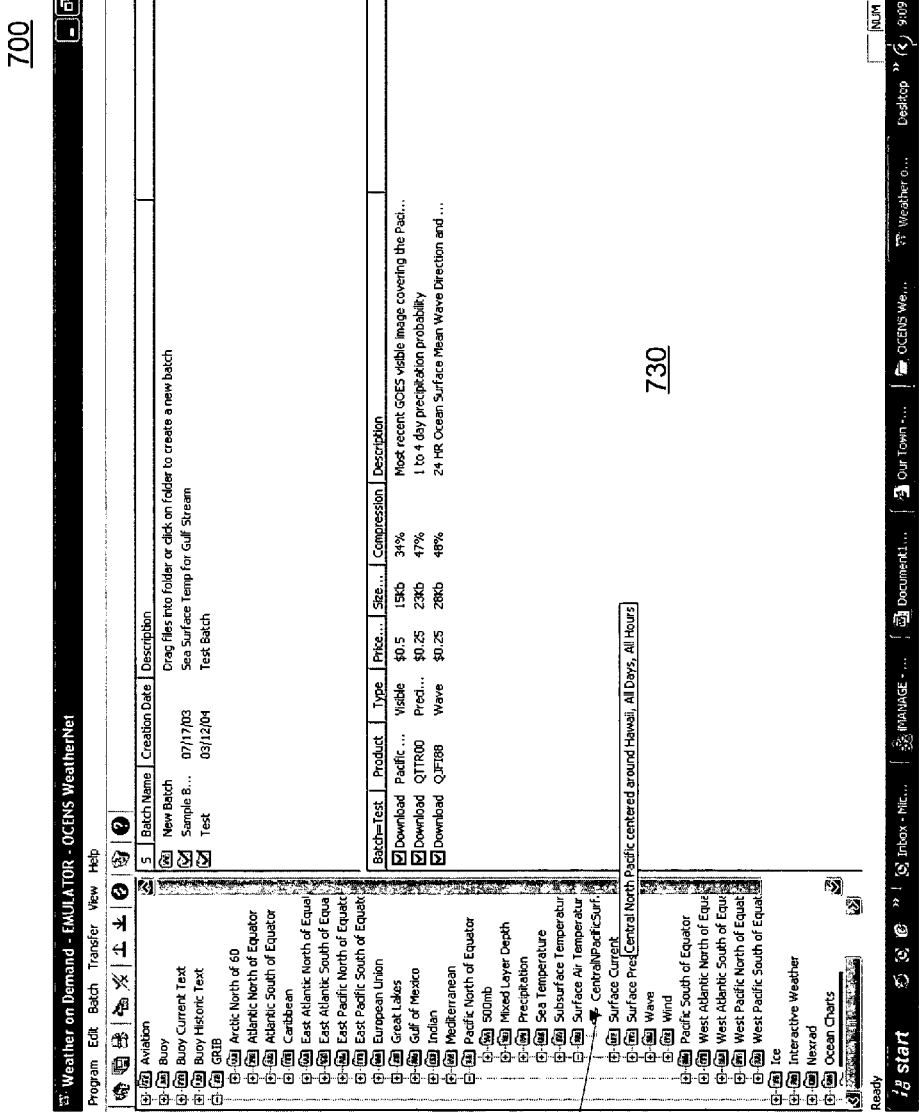
FIG. 13 is a screen image from an embodiment of a client application.

FIG. 13 shows a screen image of the user interface 700 where the Most recent GOES visible image content 1210 is added to the details section 730 of the batch file and a Central North Pacific content 1310 is selected for addition to the batch file. The user can continue to navigate the content section 710 to locate content to add to the batch file until all desired content is identified and added to the batch file.

After the batch file is built, the user can initiate download of the content identified in one or more batch files by selecting the batch files and initiating download. The user can select a download key, button, or command to initiate download of the content in one or more batch files.

Figure 14:
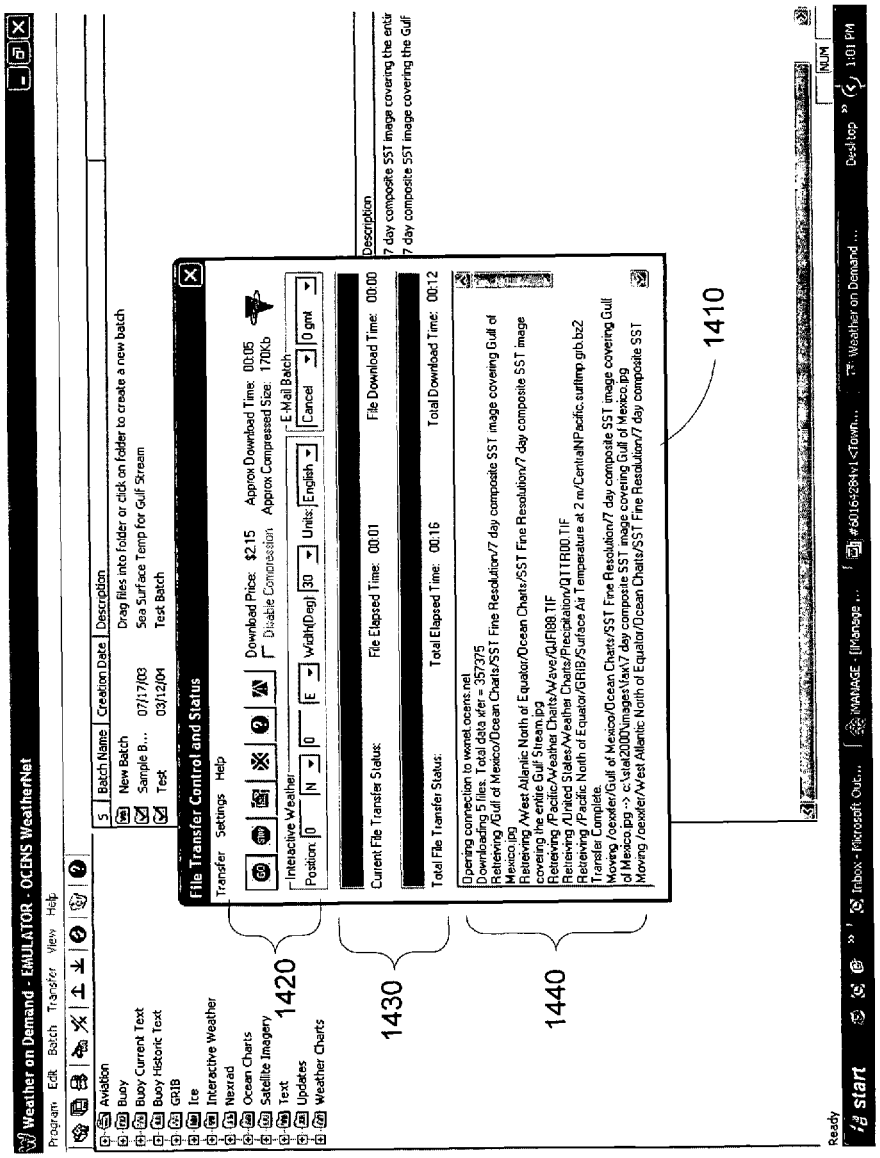
FIG. 14 is a screen image from an embodiment of a client application.

FIG. 14 is a screen image of the user interface 700 after one or more batch files have been enabled and download has been initiated. A file transfer dialog box 1410 can be used to start, monitor, and control content downloads. When downloading the contents of one or more enabled batches, all of the content selected in the batch files will be downloaded.

The file transfer dialog box 1410 includes three major regions. An upper portion of the file transfer dialog box 1410 includes a control section 1420 that can include menu items and icons that can be used to control the file download. The control section 1420 can include information informing the user of the total cost associated with the download, information regarding the time required to download the content, and the approximate compressed size of the downloadable content.

A progress section 1430 can include one or more progress bars that can display the elapsed time for downloading the current content file and the elapsed time associated with all of the content enabled in the batches for download. A status section 1440 can display descriptions of the current status of the session, including the condition of the connection, the download file status, and the storage of the files in the computer or other storage apparatus.

Figure 15:
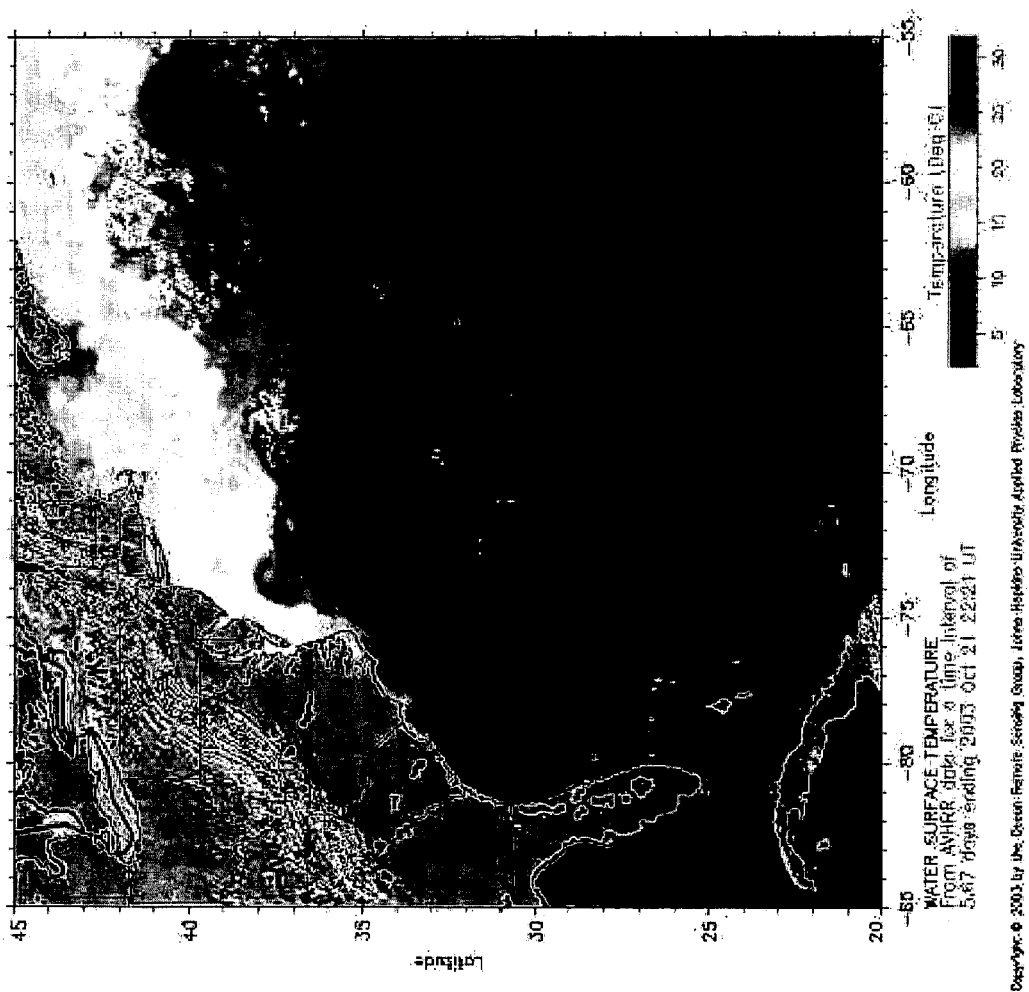
FIG. 15 is a screen image of an example of a weather image displayed on a client application.

FIG. 15 is an example of a content file that can be requested using a batch file content request and that can be delivered by the system to the client application in response to a request. The content corresponds to an sea surface temperature image 1500 covering the Gulf of Mexico, and corresponds to the first content file logged in the status section 1440 of the file transfer dialog box 1410 shown in FIG. 14.

Figure 16:
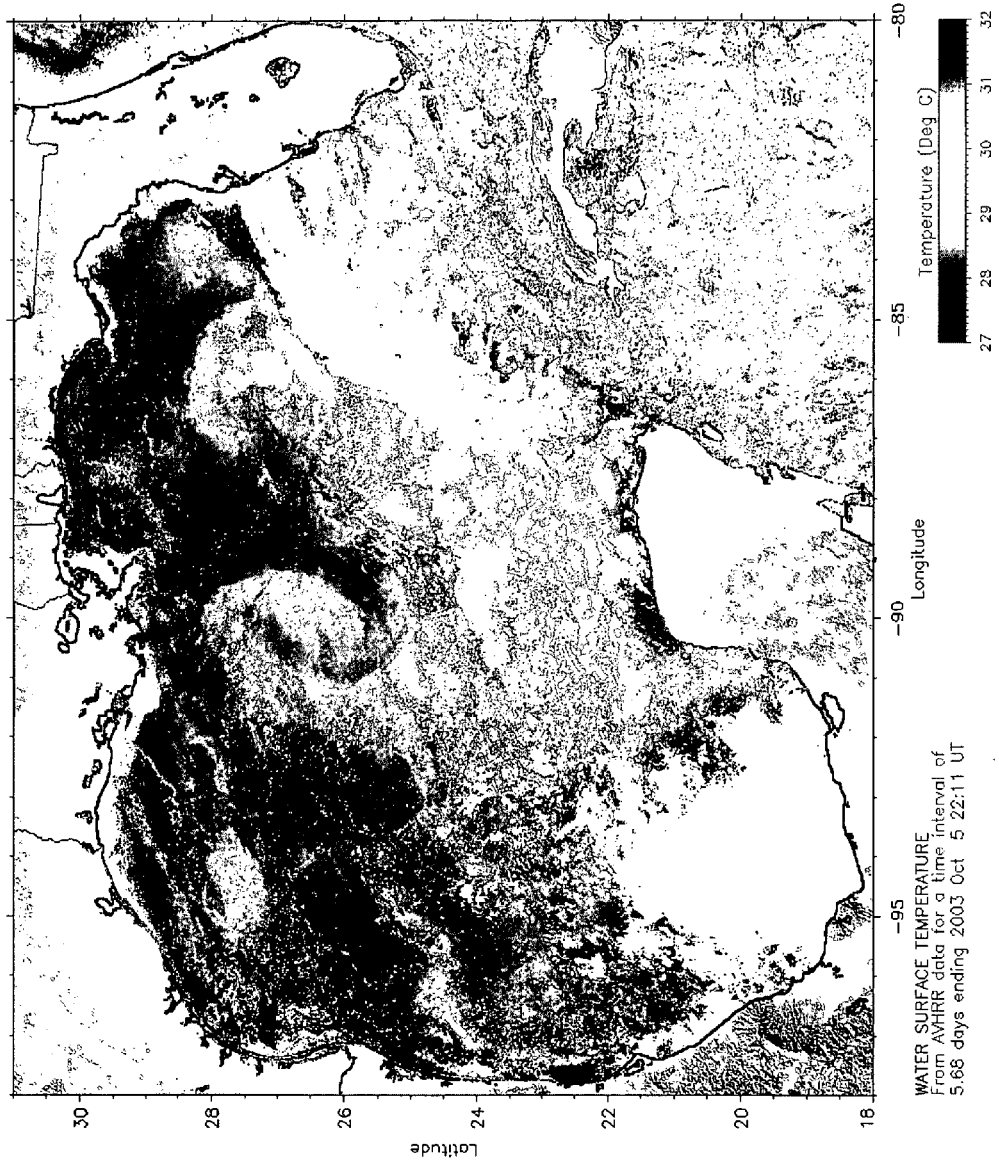
FIG. 16 is a screen image of an example of a weather image displayed on a client application.
Figure 17:
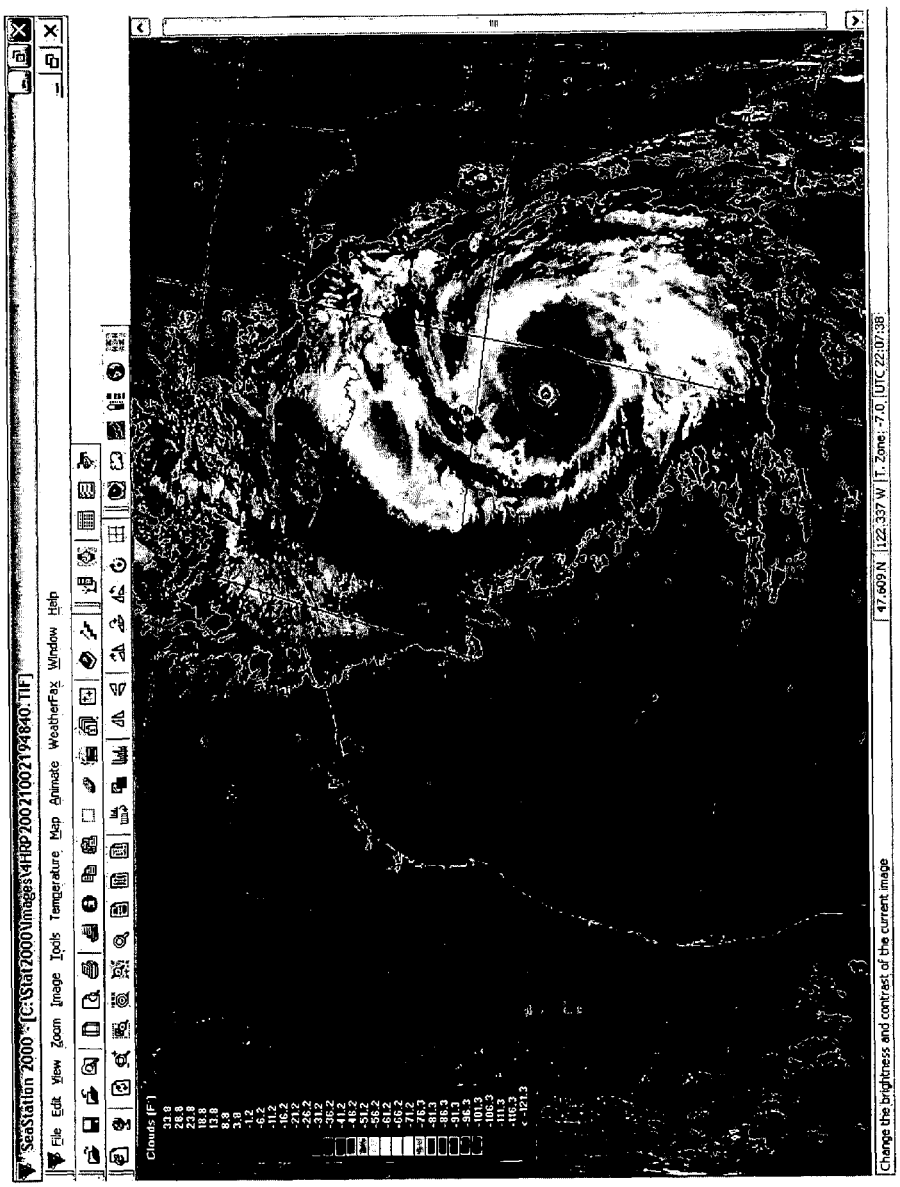
FIG. 17 is a is a screen image of an example of a weather image displayed on a client application.
Figure 18:
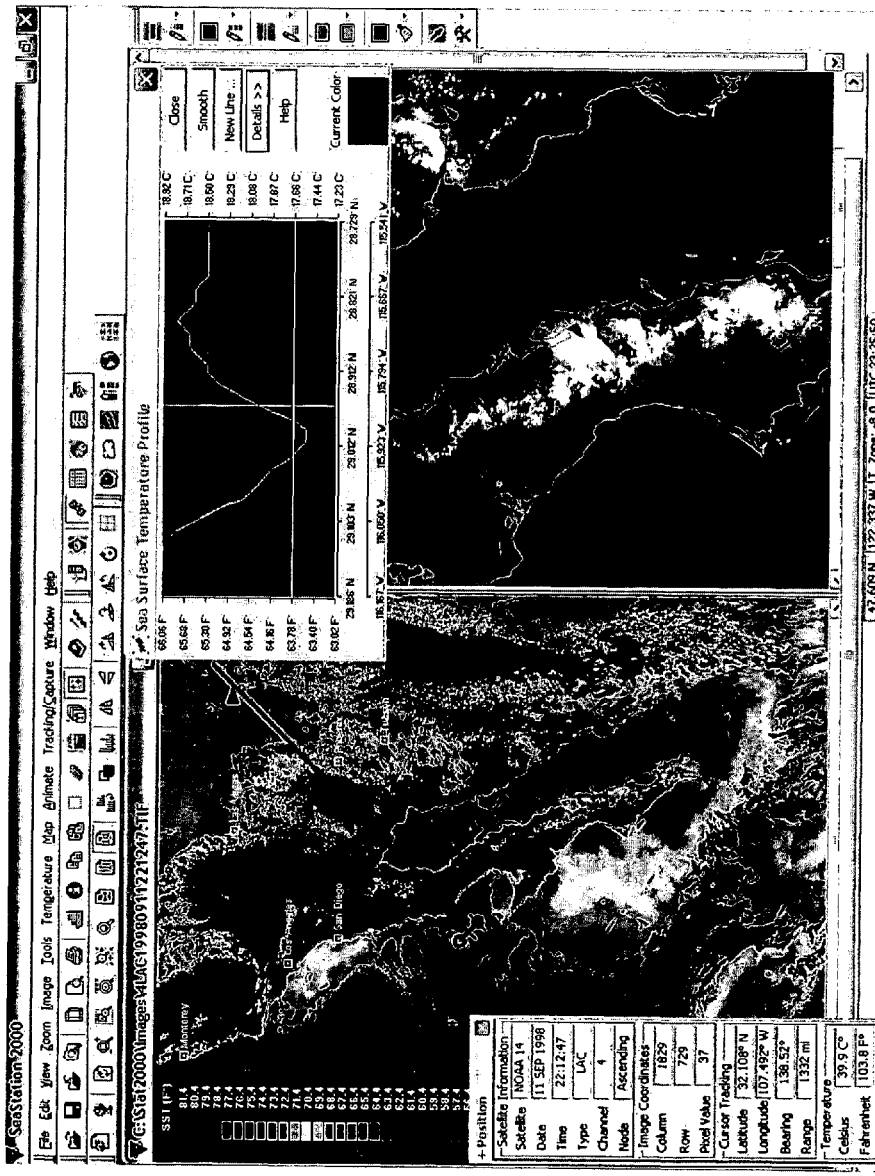
FIG. 18 is a screen image of an example of a weather image displayed on a client application.
Figure 19:
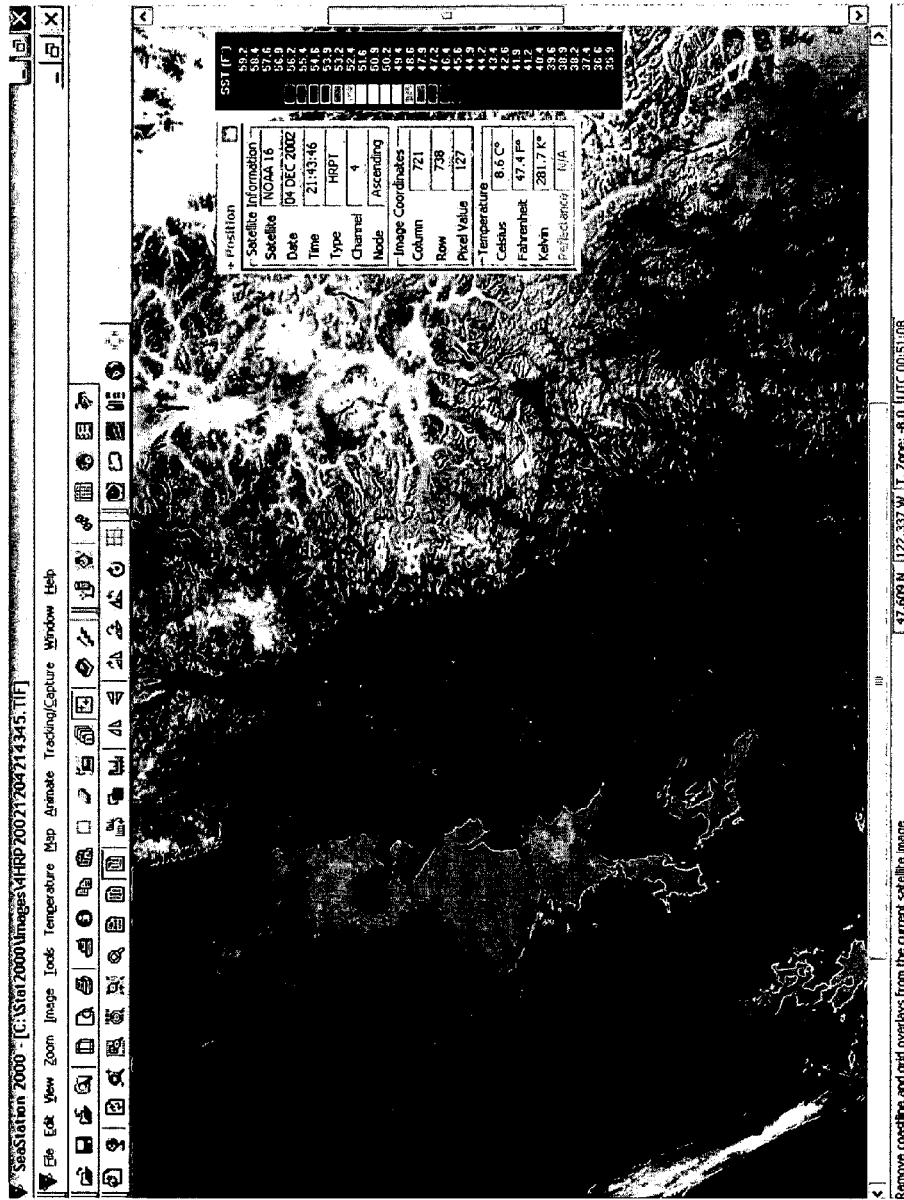
FIG. 19 is a screen image of an example of a weather image displayed on a client application.
Figure 20:
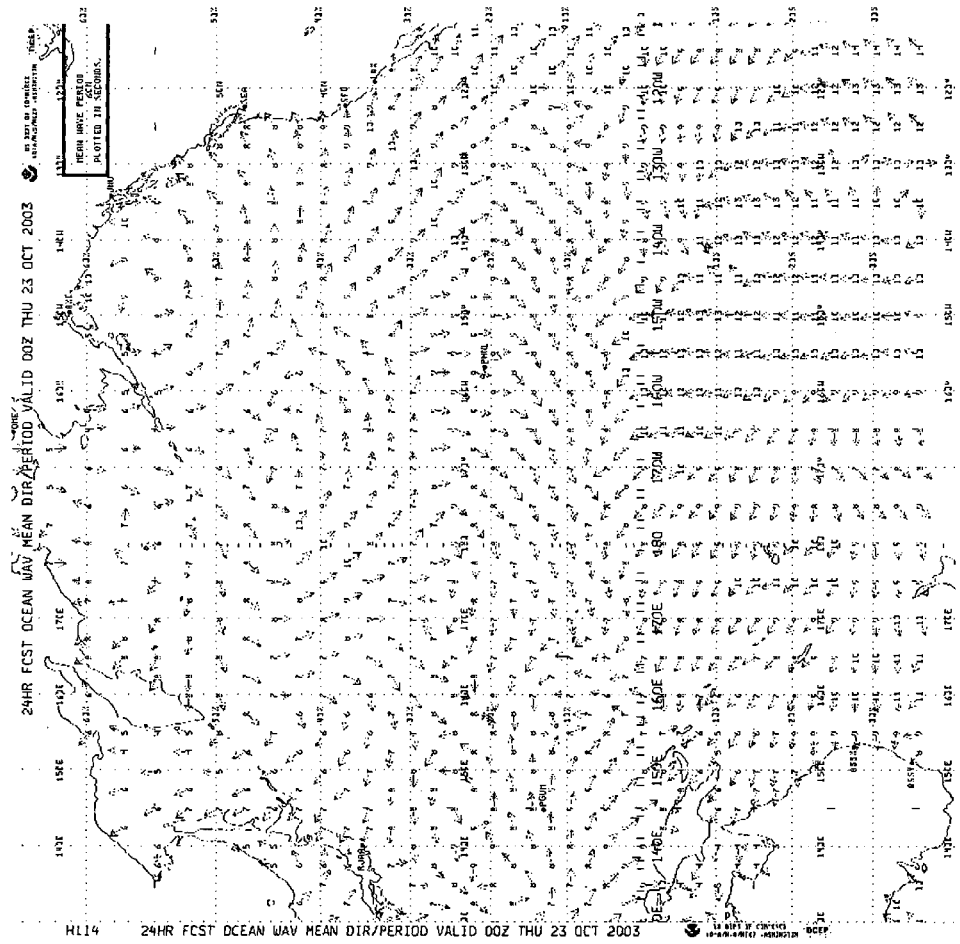
FIG. 20 is a screen image of an example of a weather image displayed on a client application.

FIG. 16 is an example of a content file that can be requested using a batch file content request and that can be delivered by the system to the client application. The content corresponds to another sea surface temperature image 1600 for the Gulf of Mexico. Similarly, FIGS. 17-20 show examples of types of content that can be requested and downloaded from the system. Although FIGS. 15-20 generally show graphic images, the content is not limited to graphic images and can include text or text in combination with graphic images.

Systems and methods for efficient transfer of requested content over communication links having relatively low bandwidths are disclosed. A user can use a content application to generate a content request while offline. One or more of the content can have a cost associated with the download of the corresponding content file. The user can determine a cost of the content and an expected connection time associated with delivery of the requested content.

The user can initiate content download by sending a content request to a server. The server can verify that the user is a valid user of the system and can deny access to those individuals that do not have an account with the system. The server can receive the content request and can fulfill the content request by accessing a data store having the content files. The data store can be stocked with the content that is retrieved from one or more original data sources.

The server can retrieve the content from the data store, compress the content files according to one or more compression algorithms, and concatenate the multiple compressed content files into a single content file. The server can then deliver the content file to the client application. The server can also determine the cost associated with fulfilling the content request and can bill an account corresponding to the user.

The client application can receive the content file and disconnect from the server immediately or shortly after receiving the entire content file. The client application can thus be configured to minimize the amount of connection time associated with generating a content request and receiving content in response to the content request.

The protocol discussed here can work efficiently over any TCP/IP connection. The protocol has been optimized for slow expensive satellite terminals but can also work well over other types of IP connections including asynchronous dial-up, broadband, and cellular data services.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of receiving content on demand from a system having stored content, the method comprising:

displaying a menu of content files from a predetermined library of available stored content files stored on a server in the system, the displayed menu comprising a displayed description of the content contained in each file;
receiving a plurality of selections comprising files selected from the predetermined content file library;
generating, prior to establishing a connection with the system, a content request comprising a batch file identifying the files selected from the predetermined content library;
establishing a communication link with the server;
transmitting the content request to the server;
receiving the selected files from the server in response to the content request, wherein prior to the transmission of the content request to the server, the files in the predetermined file library are copied from an original data source and stored on the server and periodically updated; and
outputting, based on a predetermined configuration, content from at least one of the files received from the server.

2. The method of claim 1, further comprising disconnecting the communication link with the server upon receipt of all of the requested content.

3. The method of claim 1, wherein each entry in the predetermined content file library has an associated cost.

4. The method of claim 1, wherein establishing the communication link with the server comprises establishing a wireless communication link using at least one link selected from the list consisting of a satellite communication link, a cellular telephone communication link, an HF radio communication link, and combinations thereof.

5. The method of claim 1, wherein transmitting the content request comprises transmitting the content request including an offset indicating a portion of the content request received in a prior communication.

6. The method of claim 1, wherein transmitting the content request comprises transmitting a request for at least one selected file with a content type selected from the group consisting of weather, news, sports, financial information, software, electronic charts, fishing quotas, and combinations thereof.

7. The method of claim 1, wherein transmitting the content request comprises transmitting a request for selected files with weather content of a type selected from the group consisting of GRIB, satellite images, charts, text, ice, radar, ocean charts, and combinations thereof.

8. The method of claim 1, wherein transmitting the content request comprises transmitting a request for a stored Really Simple Syndication (RSS) content file, and wherein copying the content from an original data source and storing the content on the server prior to transmission of the content request comprises downloading a RSS feed definition file to the server and building a static file from the RSS feed containing the title, date, and discussion portion of the RSS feed.

9. A method of receiving content on demand from a system having stored content, the method comprising:
displaying a menu of content files on a client device, each file comprising content from a predetermined library of available stored content stored on a server in the system, the displayed menu comprising a displayed cost for each file listed in the menu of content files and a displayed description of the content contained in each file;
generating, prior to establishing a connection with the system, a content request on the client device by receiving one or more selections comprising files selected from the menu of content files, wherein prior to transmission of the content request to the server in the system, the content in the predetermined library is copied from an original data source and stored on the server;
establishing a satellite communication link between the client device and the server;
receiving access to the system;
transmitting the content request from the client device to the server;
receiving the selected files from the server in response to the content request;
automatically disconnecting the communication link between the client device and the server upon receipt of all selected files in the content request; and
outputting, based on a predetermined configuration, content from at least one of the selected files received from the server.

10. A method of providing content on demand from a system having stored content, the method comprising:
displaying a menu of content files on a user terminal, each file comprising content from a predetermined library of available stored content stored on a server in the system;
generating, prior to establishing a connection with the system, a content request by receiving one or more selections comprising files selected from the displayed menu of content files;
establishing a communication link with the server in the system;
transmitting the content request to the server;
receiving the content request;
retrieving the selected content files, based on the content request, from a data store having copies of the content files obtained from an original content source, wherein prior to receiving the content request, the copies of the selected content files are obtained from the original content source, stored in the data store, and compressed in a predetermined manner associated with a content type to generate a plurality of compressed content files;
concatenating the plurality of compressed content files;
transmitting the selected content files from the server to local storage on the user terminal in response to the content request;
automatically disconnecting the communication link between the user terminal and the server upon receipt of all selected content files in the content request; and
retrieving at least a portion of the selected content files from the local storage and displaying content from the content files on the user terminal after the communication link has been disconnected.

11. The method of claim 10, further comprising:
determining a cost associated with the content request by summing a cost associated with each of the plurality of selected content files; and
applying a charge to a user account corresponding to an originator of the content request.

12. The method of claim 11, wherein at least one of the plurality of selected content files is available from a corresponding original content source free of charge.

13. The method of claim 10, further comprising:
receiving an offset value in addition to the content request; and
providing only a portion of the selected content files based on the offset value.

14. The method of claim 10, further comprising:
periodically retrieving each of the content files corresponding to a content library from a corresponding original content source; and
storing the copy of the content file in the data store.

15. The method of claim 10, wherein receiving the content request comprises:
   receiving a username and a password; and
   accepting the content request if the username and the password correspond to a valid username and password combination.

16. The method of claim 10, wherein compressing each of the plurality of content files comprises:
   compressing Hyper Text Markup Language (HTML) files using Burrows-Wheeler block sorting text compression; and
   compressing GIF files by resampling the GIF file at a lower resolution to generate a resampled GIF file and applying JPEG compression to the resampled GIF file.

17. The method of claim 10, wherein concatenating the plurality of compressed content files comprises:
   generating a header field identifying information regarding the concatenated plurality of compressed content files; and
   appending the header to the concatenated plurality of compressed content files.

18. An apparatus for receiving content on demand from a system having stored content, the apparatus comprising:
   a user communication device configured to establish a communication link with the system;
   a user terminal coupled to the user communication device and configured to communicate with the system when the communication link is established; and
   a client application operating in conjunction with the user terminal, and configured to display a menu of content files on the user terminal, each file comprising content from a predetermined library of available stored content stored in the system; receive user selections comprising files selected from the displayed menu of content files; generate a content request based on the user selections comprising a batch file identifying the selected files prior to establishing the communication link; command the user communication device to establish the communication link, communicate the content request to the system via the user terminal; receive the selected files in response to the content request; and automatically command the user communication device to disconnect the communication link upon receipt of all of the selected files in the content request, wherein prior to reception of the content request from the user terminal, the content is obtained from an original data source, at least a portion of the content is compressed, and the content stored in the system.

19. The apparatus of claim 18, wherein the user terminal commands the user communication device to establish the communication link in response to a user input received after generating the content request.

20. The apparatus of claim 18, wherein the user can selectively enable or disable retrieval of a selected content file corresponding to any of the plurality of content.

21. A method of providing content on demand from a system having stored content, the method comprising:
   displaying a menu of content files available to a user, each file comprising content from a predetermined library of available stored content stored in the system,
   generating, prior to establishing a connection with the system, an email content request comprising a request for content files selected from the displayed menu and an auto-batch request which requests scheduled delivery of updated content files on a periodic basis;
   establishing a communication link with a server in the system;
   receiving the email content request at a predetermined email address, the email address including a reply address corresponding to an authorized user;
   retrieving a plurality of content files, based on the email content request, from a data store having a copy of the content file obtained from an original content source, wherein prior to receiving the email content request, the copy of the content file is stored in the data store;
   generating at least one email message addressed to the reply address, the at least one email message including selected content files as an email attachment;
   delivering the at least one email message in response to the content request;
   automatically disconnecting the communication link with the server upon receipt of all selected content files in the content request;
   automatically retrieving a plurality of updated selected content files when the communication link is disconnected in accordance with the auto-batch request schedule;
   automatically reestablishing the communication link with the server in accordance with the auto-batch request schedule;
   delivering a second email message including updated selected content files as an email attachment; and
   automatically disconnecting the communication link with the server upon receipt of the updated selected content files.

22. A method of providing content on demand from a system having stored content, the method comprising:
   displaying a menu of content files available to a user, each file comprising content obtained from a predetermined library of high level global weather or ocean information content files stored on a data store in the system,
   generating, prior to establishing a connection with the system, a content request including the files selected from the displayed menu and at least one parameter for modifying the high level global weather or ocean information content file related to each selected file;
   receiving the content request;
   retrieving the high level information file from the data store, wherein prior to receiving the content request, the high level information file is retrieved from an original data source, at least a portion of the file is optionally compressed, and the file is stored in the data store;
   modifying the high level information file based at least in part on the at least one parameter to generate a dynamic content file; and
   delivering the dynamic content file in response to the content request.

23. The method of claim 22, wherein the at least one parameter includes a latitude value and a longitude value.

24. The method of claim 22, wherein the parameter is a request to receive information selected from the group consisting of GRIB, satellite images, charts, text, ice, radar, ocean charts, and combinations thereof.

* * * * *